(12) United States Patent
Ugajin et al.

(10) Patent No.: US 7,113,931 B1
(45) Date of Patent: Sep. 26, 2006

(54) METHOD OF FABRICATING A FRACTAL STRUCTURE FOR CONSTRUCTING COMPLEX NEURAL NETWORKS

(75) Inventors: Ryuichi Ugajin, Tokyo (JP); Yoshihiko Kuroki, Kanagawa (JP); Akira Ishibashi, Tokyo (JP); Shintaro Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 267 days.

(21) Appl. No.: 09/787,212

(22) PCT Filed: Jul. 14, 2000

(86) PCT No.: PCT/JP00/04743

§ 371 (c)(1),
(2), (4) Date: Jul. 16, 2001

(87) PCT Pub. No.: WO01/06406

PCT Pub. Date: Jan. 25, 2001

(30) Foreign Application Priority Data

Jul. 14, 1999 (JP) ................................. 11-200866
Feb. 29, 2000 (JP) ............................. 2000-054246

(51) Int. Cl.
*G06E 1/00* (2006.01)
*G06E 3/00* (2006.01)
*G06F 15/18* (2006.01)
*G06G 7/00* (2006.01)
*G06N 3/02* (2006.01)

(52) U.S. Cl. ........................................... 706/15
(58) Field of Classification Search ................ 706/15, 706/13, 23, 26, 27, 924, 932

See application file for complete search history.

(56) References Cited

U.S. PATENT DOCUMENTS

| 5,504,487 A * | 4/1996 | Tucker ........................ 342/90 |
| 5,612,700 A * | 3/1997 | Tucker ........................ 342/90 |
| 6,094,050 A * | 7/2000 | Zaroubi et al. ............. 324/309 |
| 6,553,355 B1 * | 4/2003 | Arnoux et al. ................ 706/13 |

OTHER PUBLICATIONS

Bieberich, E., "Structure in Human Consciousness: A Fractal Approach to the Topology of The Self Perceiving an Outer World an Inner Space", Feb. 1999, Retrieved from the Internet: http://cogprints.esc.soton.ac.uk/archive/00000.*

Gaussier et al., "Navigating with an Animal Brain: A Neural Network for Landmark Identification and Navigation", NEC Researc Index, 1994, Retrieved from the Internet: http://citeseer.nj.nec.com/gaussier94navigating.html.*

Bressloff et al., "Analysis of Associative Reinforcement Learning in Neural Networks Using Iterated Function Systems", IEEE Transactions on Systems, Man and Cybernetics, vol. 22, No. 6, Nov. 1992.*

(Continued)

*Primary Examiner*—Anthony Knight
*Assistant Examiner*—Michael B. Holmes
(74) *Attorney, Agent, or Firm*—Sonnenschein Nath & Rosenthal LLP

(57) ABSTRACT

A fracture structure is grown from a plurality of starting points. A fractal structure, grown from respective starting points and interconnected by interactive growths, forms a neural network. A growth speed originated at a specific starting point is determined by the probability of a material reaching a grown portion from a remote location by means of a diffusion process and the probability of a growth promoting factor reaching a grown portion by means of a diffusion process from a portion grown from a starting point other than the specific one. Anisotropy is introduced into a space in which a fractal structure is to be grown, as required.

23 Claims, 40 Drawing Sheets

OTHER PUBLICATIONS

Chakraborty et al., "Fractal Connection Stucture: Effect on Generalization in Supervised Feed-Forward Networks", IEEE International Conference on Neural Networks, Jun. 1996, vol. 1, pp. 264-269.*

Zou et al., "A Chaotic Attractor with Cellular Neural Networks", IEEE Transactions on Circuits and Systems, Jul. 1991, vol. 38, No. 7.*

Lister, R., "Annealing Networks and Fractal Landscapes", IEEE International Conference on Neural Networks, 1993, vol. 1, pp. 257-262.*

Indjic, D., "Reduction in Power System Load Data Training Sets Size Using Fractal Approximation Theory", Data Compression Conference, Apr. 1991.*

Kotsavasiloglou et al., "Model for a Neural Network Structure and Signal Transmission", Physical Review, Oct. 1997, vol. 5 No. 4.*

Dissado et al., "Propagation of Electrical Tree Structures in Solid Polymeric Insulation", IEEE Transaction on Dielectrics and Electrical Insulation, Jun. 1997, vol. 4, No. 3.*

Culver et al., "Computer Simulation of a Brain Slice Using Fractals", Proceedings of the 3rd Annual IEEE Symposium on Computer-Based Medical Systems, Jun. 1990, pp. 512-516.*

Bieberich, E., "Structure in Human Consciousness: A Fractal Approach to the Topology of the Self Perceiving an Outer World i an Inner Space", 1998, Received from the Internet: Http://cogprints.ecs.soton.ac.uk/archieve/00000079/00/stru2.html.*

Selvam, A.M., "Cantorian Fractal Spacetime and Quantum-like Chaos in Neural Networks of the Human Brain", Sep. 1998, Received from the Internet: Http://www.geocities.com/Capecanaveral/lab/5833/neuron/brain.html.*

Lin et al., "Hierarchy-Induced Isotropy-Anisosotropy Transition on a Fractal Resistor Network", Journal of Physics A: Mathematical and General, vol. 29, No. 9, May 1996.*

Ling Zhang, Bo Zhang and Gang Chen "Generating and Coding of Fractal Graphs by Neural Network and Mathematical Morphology Methods"; IEEE Transactions on Neural Networks, Mar. 1996. vol. 7. No. 2. pp. 400-407.

Amita Chandra et al., "Fractal Growth in UV-Irradiated DNA: Evidence on Non-universal Diffusion Limited Aggregation", Physical Review E., Apr. 1995; vol. 51, No. 4, pp. 51.R2767-51. R2768.

G. Albinet and P. Pelce, "Computer Simulation of Neurite Outgrowth", Europhysics Letters, Mar. 1996, vol. 33, No. 7, pp. 569-574.

Kenji Iba, et al, "Automatic Map-Drawing Method for Power System Networks Using Fractal Approach", Feb. 1994, vol. 114-C, No. 2, pp. 252-258 (English abstract only).

* cited by examiner $\psi_\infty = 0$ $\psi_\infty = -1$ $\psi_\infty = -0.6$ $\psi_\infty = -0.2$ $\psi_\infty = 1$ $\psi_\infty = 0.6$ $\psi_\infty = 0.2$ $m = l = 0.5$ m = l = 0.75

$m = l = 1.0$ $m = 1 = 1.25$ $m = 1 = 1.5$ $m = l = 2.0$

METHOD OF FABRICATING A FRACTAL STRUCTURE FOR CONSTRUCTING COMPLEX NEURAL NETWORKS

TECHNICAL FIELD

This invention relates to a method for fabricating a fractal structure, especially suitable for application to constructing a complex network such as neural network, for example.

BACKGROUND ART

Conventional Neuman computers have exercised their great power in computers configured to sequentially execute specific algorithms and have supported modern scientific technologies. In order to design CPU of such a computer, a complicated electronic circuit has to be produced and progressively optimized by executing its simulation. As its design tool, a CAD system for making a complicated electronic circuit is indispensable.

In recent years, information processing learning from brains, such as neural network model, has been widely researched with a hope of realization as exercising its power in pattern recognition. In case a neural network model is practically applied in form of a device, it is preferable to realize a network such as neural network of a brain in form of a certain system. Following such a plan, experiments are being conducted toward artificially making nerves for living bodies, and their future development is being expected.

Nerve cells of brains individually have complicated tree-like projections to form a fractal structure. Such fractal elements grow while interacting with each other, and make up a complicated brain neural network.

In order to simulate the function of a preferable network, a technique for creating such a brain neural network is indispensable. That is, there is a strong demand for a technique for making a complicated network, which corresponds to a CAD system that has been indispensable for conventional Neuman computers. However, there are no conventional techniques that make up a structure coupling a plurality of fractal elements while controlling their fractal nature.

It is therefore an object of the invention to provide a method for making a fractal structure, which can make a complicated network like a neural network easily in a well-controlled manner.

A further object of the invention is to provide a method for making a fractal structure, which can control the coupling mode among different fractal structures and can make complicated networks with a more variety of structures such as neural networks easily in a well-controlled manner.

DISCLOSURE OF INVENTION

The Inventors made active studies toward solution of the above-mentioned problem, and as a result, found that it would be possible to make complicated networks such as neural networks by growing fractal structures from different start sites and have them interact with each other. Additionally, the Inventors found that it would be possible to control the coupling mode among fractal structures by introducing anisotropy into spaces for growing the fractal structures. Thus the Inventors have reached the present invention.

In order to solve the above mentioned subject, according to the invention, there is provided a method for fabricating a fractal structure characterized in growing fractal structures from a plurality of start sites, respectively, while having said fractal structures interact with each other, to form fractal structures coupled to each other.

In the present invention, universal interaction among element fractal structures is controlled against fluctuation in growth process of fractal structures from individual start sites.

In the present invention, growth rate from a specific start site among a plurality of start sites is determined by the probability that a material reaches a portion already grown from a remote position due to a diffusion process and the probability that a growth promotion factor reaches the portion already grown from portions grown from the other start sites due to a diffusion process. The growth rate is proportional to the product of the power function of the probability that the material reaches the portion already grown from a remote position due to a diffusion process and the power function of the probability that the growth promotion factor reaches the portion already grown from portions grown from the other start sites due to a diffusion process. Further, in the present invention, fractal property of a structure, its self-similarity, complexity or number of coupling is typically controllable parametrically. More specifically, relative potential determining diffusion of a growth promotion factor among individual fractal structures grown from a plurality of start sites is appropriately adjusted relative to a site at infinity, and thereby, fractal property, self-similarity, complexity or number of coupling of a structure is controllable substantially parametrically.

In the present invention, anisotropy may be introduced into the space in which the fractal structure is grown. More specifically, for example, in case the growth rate from a specific start site among a plurality of start sites is determined by the probability that a material reaches a portion already grown from a remote position due to a diffusion process and the probability that a growth promotion factor reaches the portion already grown from portions grown from the other start sites due to a diffusion process, diffusion coefficient in the diffusion process in the space for growing the fractal structure has an anisotropy. Also in this case, fractal property of a structure, its self-similarity, complexity or number of coupling is typically controllable parametrically. The anisotropy is not limited to the anisotropy of the diffusion coefficient, but may be, for example, an anisotropy of the dielectric constant in the space for growing the fractal structure.

According to the invention having the configuration summarized above, by growing fractal structures from a plurality of start sites while having individual structures frown from their respective start sites to interact with each other to form fractal structures coupled to each other, it is possible to fabricate a network made up of elements individually having fractal complexity easily in a well-controlled manner.

Further, in case an anisotropy is introduced into the space for growing the fractal structure in, when individual fractal structures grow from their respective start sites while interacting with each other to form fractal structures coupled to each other, the response produced inside a single fractal structure is affected by a stronger nonlinear effect from coupling of different fractal structures. Then, remarking the number of sites where different fractal structures contact as an index of control of the coupling mode among fractal structures, nonlinearity can be controlled by controlling the number of those sites.

BEST MODE FOR CARRYING OUT THE INVENTION

Figure 1:
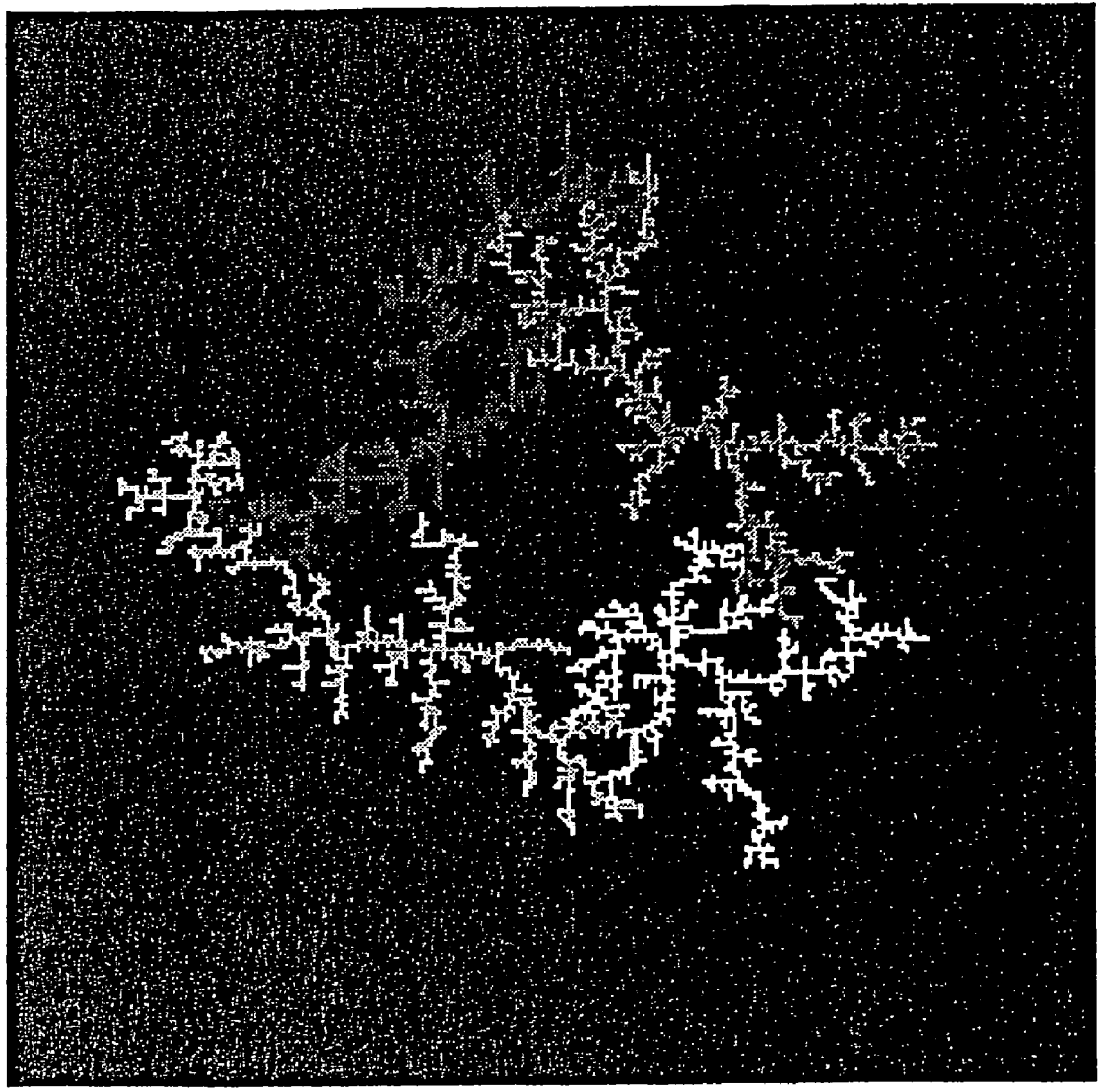
FIG. 1 is a schematic diagram that shows a result of simulation for fabricating a neural network according to the invention.

Explained below are embodiments of the invention with reference to the drawings.

(1) Dielectric Breakdown Model

First explained is a method of making a singular fractal figure (for example, a figure such as tree-like projections) ((1) A. Erzan, L. Pietronero, A. Vespignani, Rev. Mod. Phys. 67, 545(1995); (2) T. A. Witten, Jr. and L. M. Sander, Phys. Rev. Lett. 47, 1400(1984); Phys. Rev. B 27, 5686(1983)). This method is a dielectric breakdown model proposed by Niemeyer et al. ((3) L. Niemeyer, L. Pietronero, H. J. Wiesmann, Phys. Rev. Lett. 52, 1033(1984)).

As an example, a tetragonal lattice S in a two-dimensional space is defined, and a scalar potential field $\phi(i, j)$ is defined on a lattice site $(i_1, i_2, i_3) \in S$. This is called an electric potential. Let this electric potential follow a Laplace equation:

$$\Delta\phi(i,j)=0$$

The figure $T_n$ defined therefrom is a set of lattice sites on a two-dimensional lattice. $T_0$ consists of (0, 0) alone, and $T_{n+1}$ is created by sequentially adding one lattice site to $T_n$ by the following rule.

Let the electric potential of each site contained in $T_n$ be 1 and the electric potential at a site at infinity be 0. That is, $$\phi(i,j)=0 \text{ when } (i,j)\to\infty \tag{2}$$

$$\phi(i,j)=1 \text{ when } (i,j)\in T_n \tag{3}$$

Equation (1) is solved under that boundary condition, and electric potential of each lattice site is determined. The lattice site to be added to $T_n$ to form $T_{n-1}$ is not included in $T_n$, and it is selected from a set $U_n$ of lattice sites closest to $T_n$. The number of lattice sites contained in $U_n$ is written as $N_n$:

For each site contained in $U_n$ $(i_m, j_m)$ (where m=1, 2, ..., $N_n$), its electric field intensity is defined as:

$$E_m(\alpha)=|\phi(i_m,j_m)-1|^\alpha \tag{4}$$

The probability that a site $(i_m, j_m)$ in $U_n$ is proportional to its electric field intensity $E_m(\alpha)$. That is, the probability is:

$$p_m(\alpha) = \frac{E_m(\alpha)}{\sum_{j=1}^{N_n} E_j(\alpha)} \tag{5}$$

By repeating the above operation, $T_n$ is formed progressively. An ideal fractal will be the infinitely repeated extreme set:

$$T_\infty = \lim_{n\to\infty} T_n \tag{6}$$

In case of $\alpha=1$, the above coincides with the result of generation of a figure by diffusion limited aggregation ((2) T. A. Witten, Jr. and L. M. Sander, Phys. Rev. Lett. 47, 1400(1984); Phys. Rev. B 27, 5686(1983)).

(2) Fractals that Grow While Interacting with Each Other

Defined below are fractals that grow while interacting with each other (interacting fractals), i.e. a coupled-fractal network. As an example, fractals made up of $N_c$ species are taken on a tetragonal lattice S in a two-dimensional space. A scalar potential field $\phi((i, j)$ is defined on a lattice site $(i_1, i_2, i_3)\in S$, and this is called a potential. Then, $\psi^{(1)}(i, j), \psi^{(2)}(i, k), \ldots, \psi^{(N_c)}(i, j)$ are also defined. They satisfy the differential equations:

$$\Delta\phi(i,j)=0 \tag{7}$$

$$\Delta\psi^{(1)}(i,j)=0 \tag{8}$$

$$\Delta\psi^{(2)}(i,j)=0 \tag{9}$$

$$\Delta\psi^{(N_c)}(i,j)=0 \tag{10}$$

The figure $T_n$ defined therefrom is a set of lattice sites on a two-dimensional lattice, and respective lattice sites are classified into $N_c$ species. That is, $$T_n = \bigcup_{j=1}^{N_c} Q_n^{(j)} \tag{11}$$

and respective species are exclusive from each other. That is, $$Q_n^{(j)} \cap Q_n^{(k)} = \theta \text{ if } j \neq k \tag{12}$$

$Q_0^{(k)}$ consists of a single lattice site $(z_{ini}^{(k)}, j_{ini}^{(k)})$ exclusively, and $T_{n+1}$ is created by sequentially adding one lattice site to $T_n$ by the following rule. First, Equation (7) is solved under the boundary conditions:

$$\phi(i,j)=0 \text{ when } (i,j)\to\infty \tag{13}$$

$$\phi(i,j)=1 \text{ when } (i,j)\in T_n \tag{14}$$

and potential of each lattice site is determined. Further, Equations (8) through (10) are solved under the boundary conditions:

$$\psi^{(k)}(i,j)=0 \text{ when } (i,j)\to\infty \tag{15}$$

$$\psi^{(k)}(i,j)=1 \text{ when } (i,j)\in Q_n^{(k)} \tag{16}$$

$$\psi^{(k)}(i,j)=-1 \text{ when } (i,j)\in Q_n^{(l)}(k\neq l) \tag{17}$$

and $\psi^{(k)}(i,j)$ is determined. The lattice site to be added to $T_n$ to form $T_{n+1}$ is not included in $T_n$, and it is selected from a set $U_n^{(k)}$ of lattice sites closest to $Q_n^{(k)}$.

The number of lattice sites contained in $U_n^{(k)}$ is written as $N_n^{(k)}$. That is, the lattice site to be added to $T_n$ is selected from the following set:

$$U_n = \bigcup_{k=1}^{N_c} U_n^{(k)} \tag{18}$$

and the number of lattice sites contained in the set, i.e. the number of candidates, is:

$$N_n = \sum_{k=1}^{N_c} N_n^{(k)} \qquad (19)$$

For each site $(i_m^{(k)}, j_m^{(k)})$ ($m=1, 2, \ldots, N_n^{(k)}$) contained in $U_n^{(k)}$, intensity of its electric field is defined as:

$$E_m^{(k)}(\alpha,\beta) = |\phi(i_m^{(k)}, j_m^{(k)}) - 1|^\alpha \times \psi(i_m^{(k)}, j_m^{(k)}) - 1|^\beta \qquad (20)$$

The probability that a site $(i_m^{(k)}, j_m^{(k)})$ in $U_n$ is selected is proportional to intensity of its electric field $E_m^{(k)}(\alpha,\beta)$. That is, the probability is:

$$p_m^{(k)}(\alpha, \beta) = \frac{1}{\Delta} E_m^{(k)}(\alpha, \beta) \qquad (21)$$

$$\Delta = \sum_{k=1}^{N_c} \sum_{j=1}^{N_n^{(k)}} E_j^{(k)}(\alpha, \beta) \qquad (22)$$

By repeating the above-mentioned procedures, $T_n$ is formed progressively.

Here is given a physical (or physiologic) interpretation regarding the above model. $\phi(i, j)$ provides the probability of arrival of a growth material $S_{rc}$ transported from a remote site by diffusion at a region permitting growth from interpretation of the dielectric breakdown model. On the other hand, $\psi_k(i, j)$ provides the probability of arrival of any substance X transported to a region permitting growth of the k-th species from portions where species except for the k-th species have been already grown. The assumption that the probability that growth of the k-th species occurs is proportional to the product means the assumption that the growth occurs only when both the growth material $S_{rc}$ and the substance X have arrived. That is, here is assumed the situation in which growth occurs by adhesion of the growth material $S_{rc}$ to the portion where the k-th species has already grown with the aid of an adhesive substance X. Of course, it means a reaction that is rate-determined by adhesion interposing the adhesive substance X. In an alternative interpretation, it is possible to consider that $\phi(i, j)$ provides the probability of arrival of the growth material $S_{rc}$ transported by diffusion from a remote site to the region where it can grow, similarly to the above interpretation whereas $\psi_k(i, j)$ provided the potential at the position of the k-th species, and the probability that growth of the k-th species occurs is proportional to the product of the probability of arrival of the growth material $S_{rc}$ and the intensity of the electric field.

Figure 2:
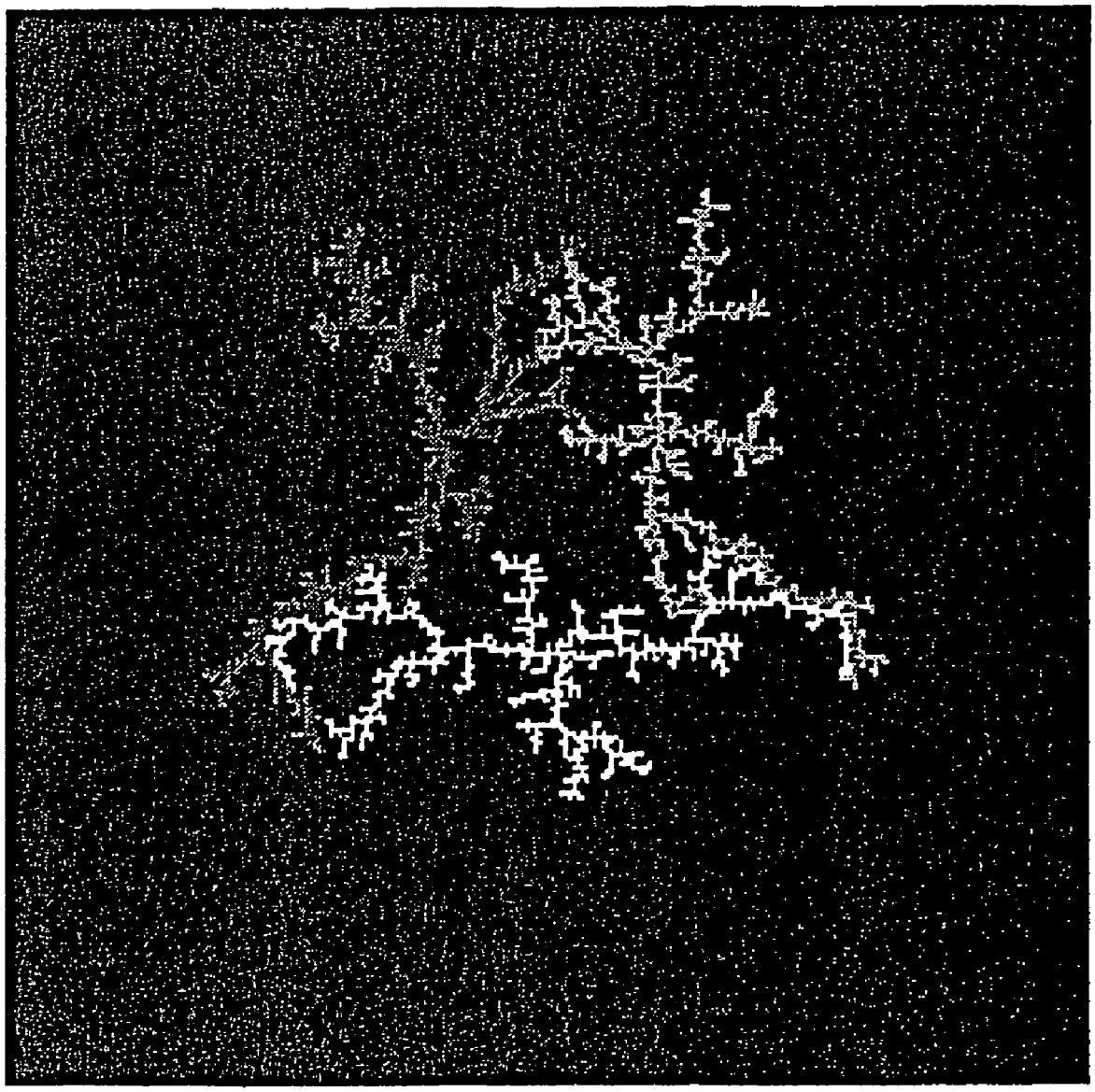
FIG. 2 is a schematic diagram that shows a result of simulation for fabricating a neural network according to the invention.
Figure 3:
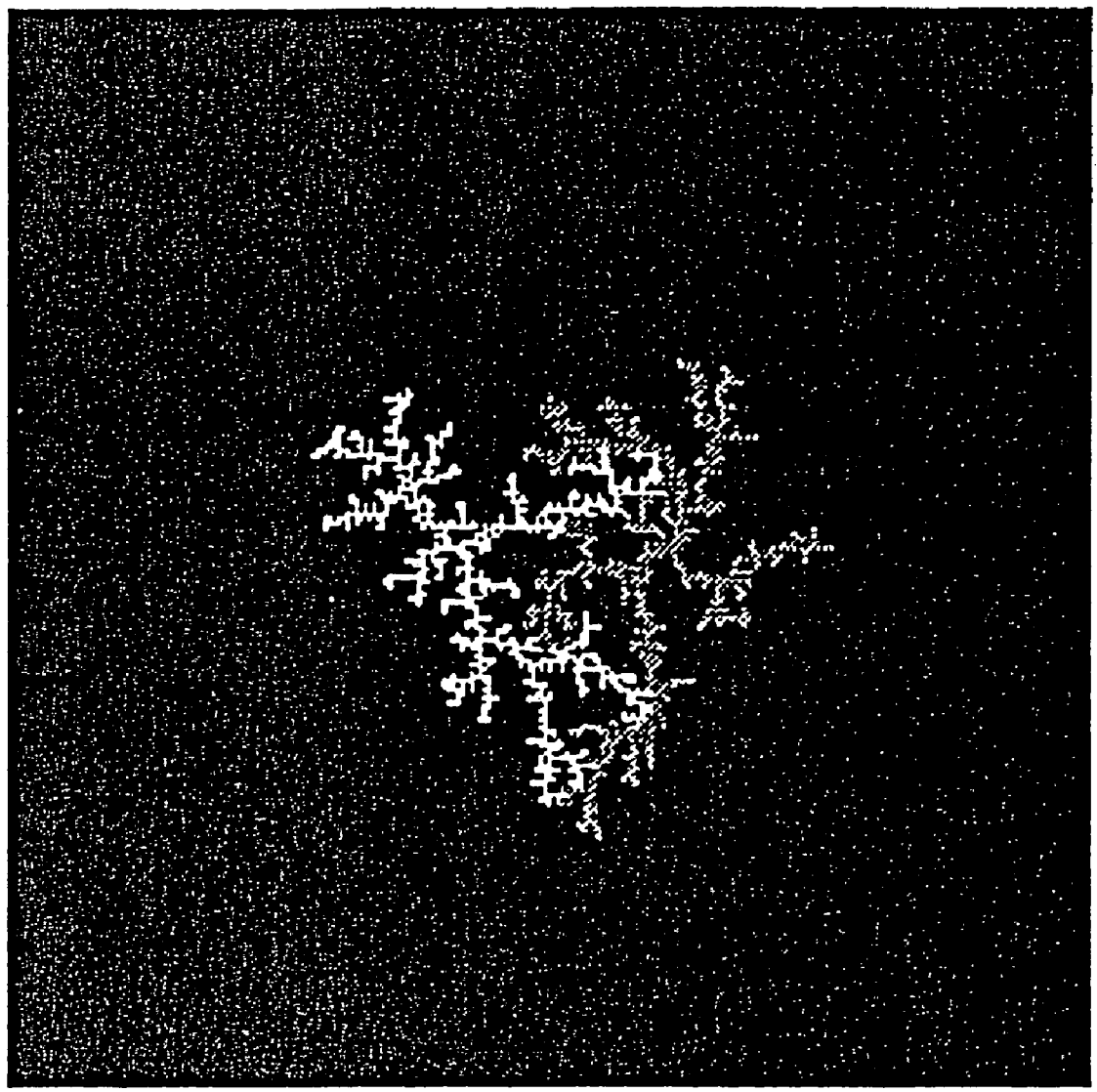
FIG. 3 is a schematic diagram that shows a result of simulation for fabricating a neural network according to the invention.
Figure 4:
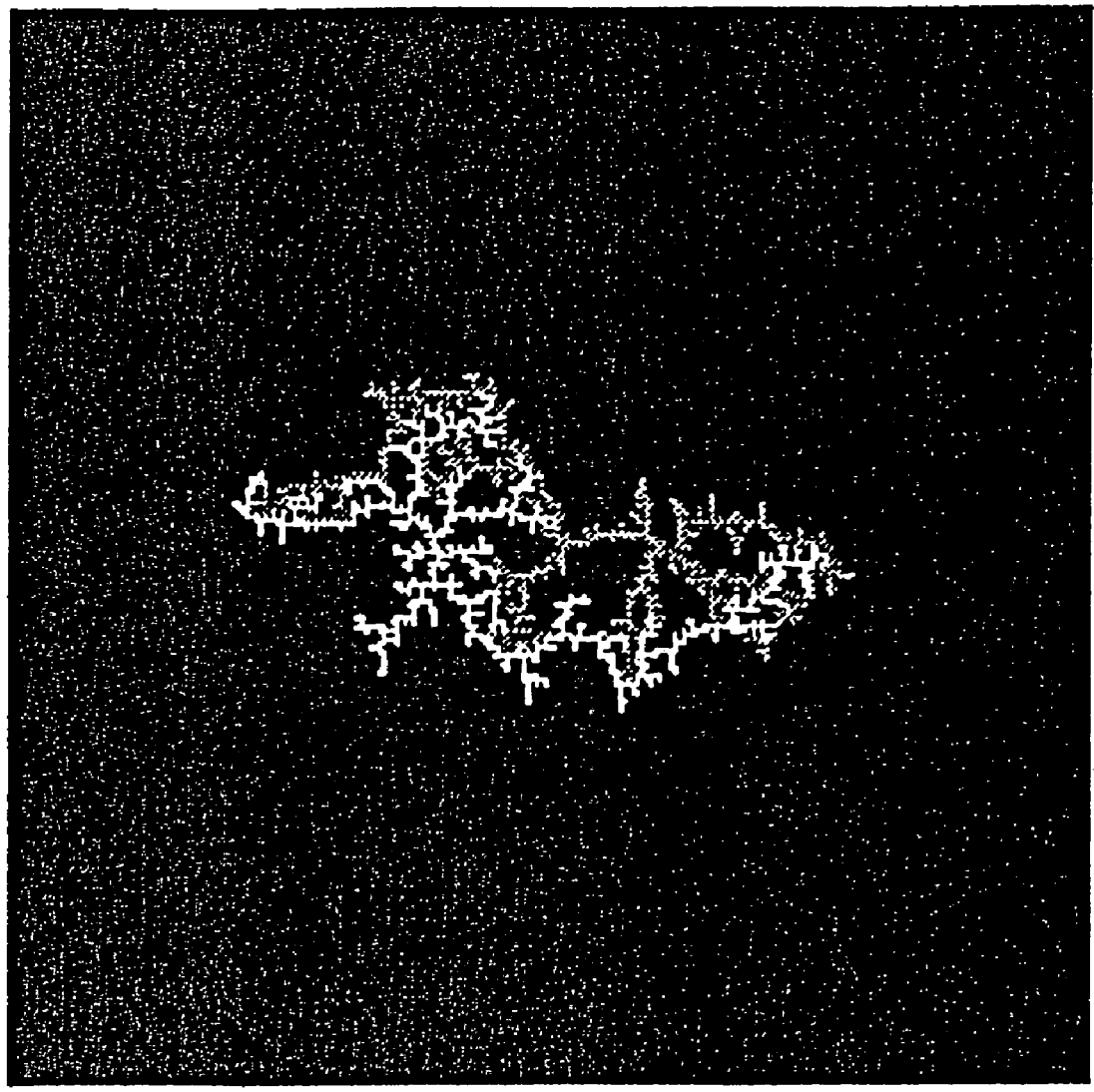
FIG. 4 is a schematic diagram that shows a result of simulation for fabricating a neural network according to the invention.
Figure 5:
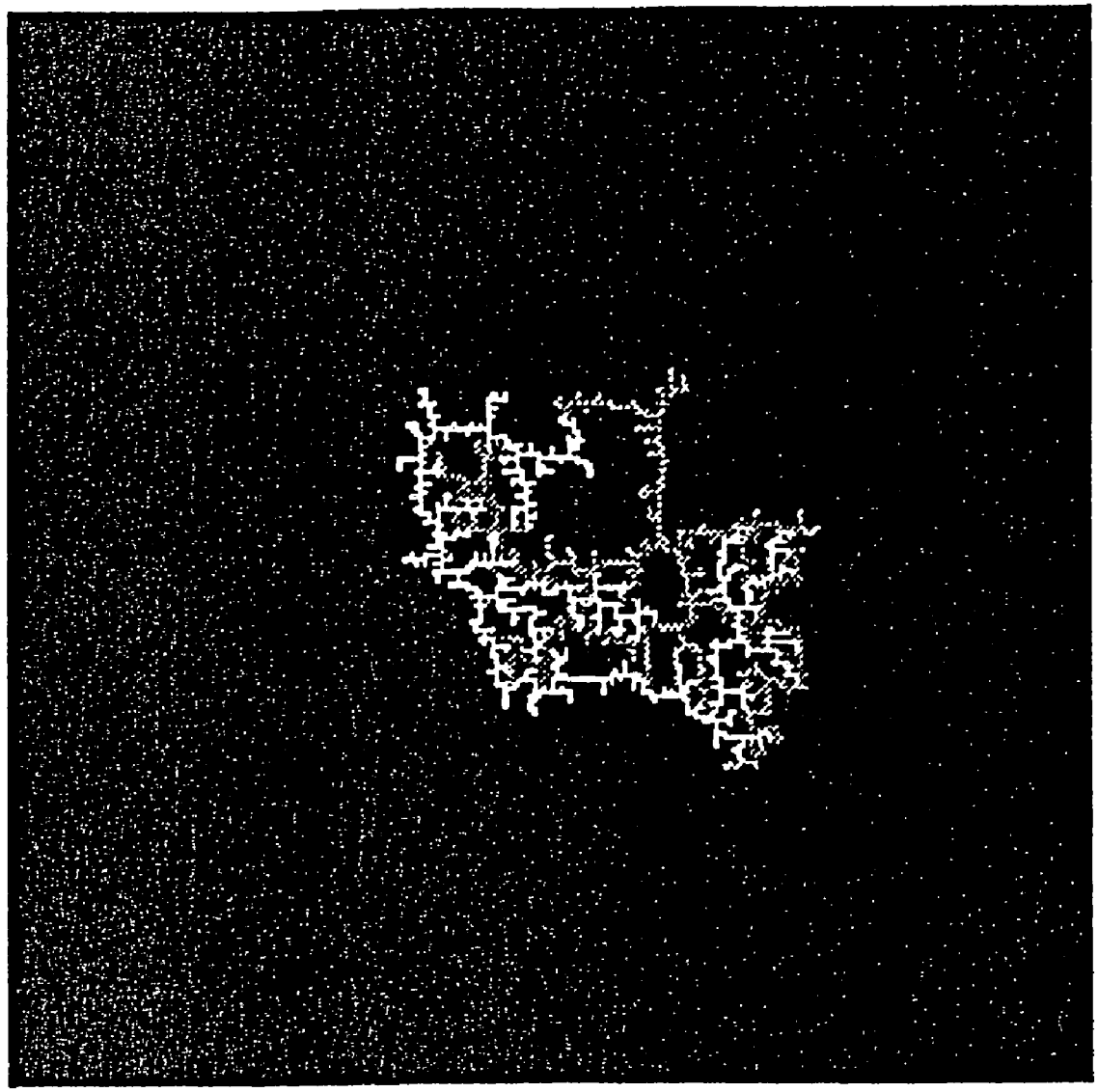
FIG. 5 is a schematic diagram that shows a result of simulation for fabricating a neural network according to the invention.
Figure 6:
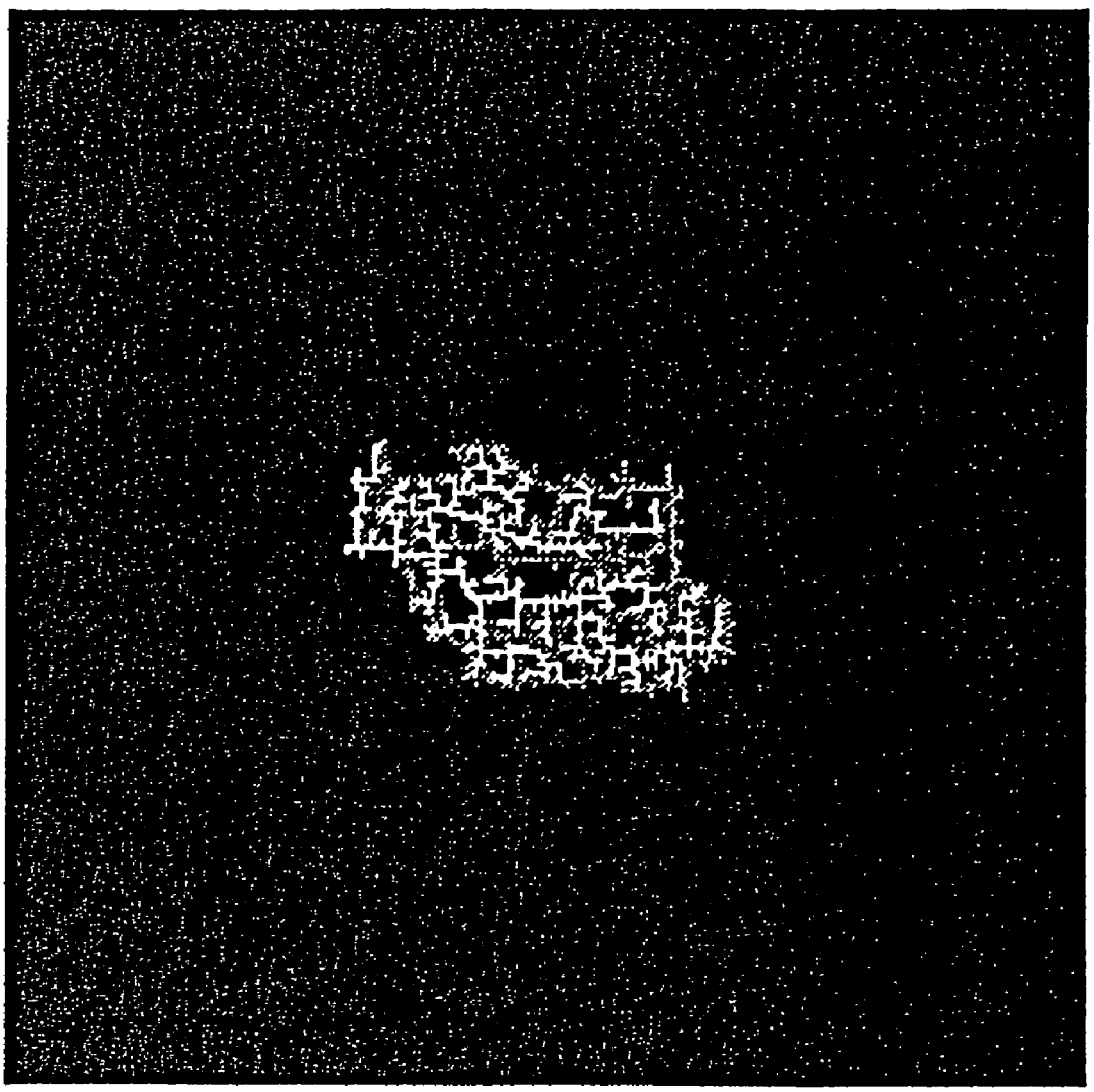
FIG. 6 is a schematic diagram that shows a result of simulation for fabricating a neural network according to the invention.
Figure 7:
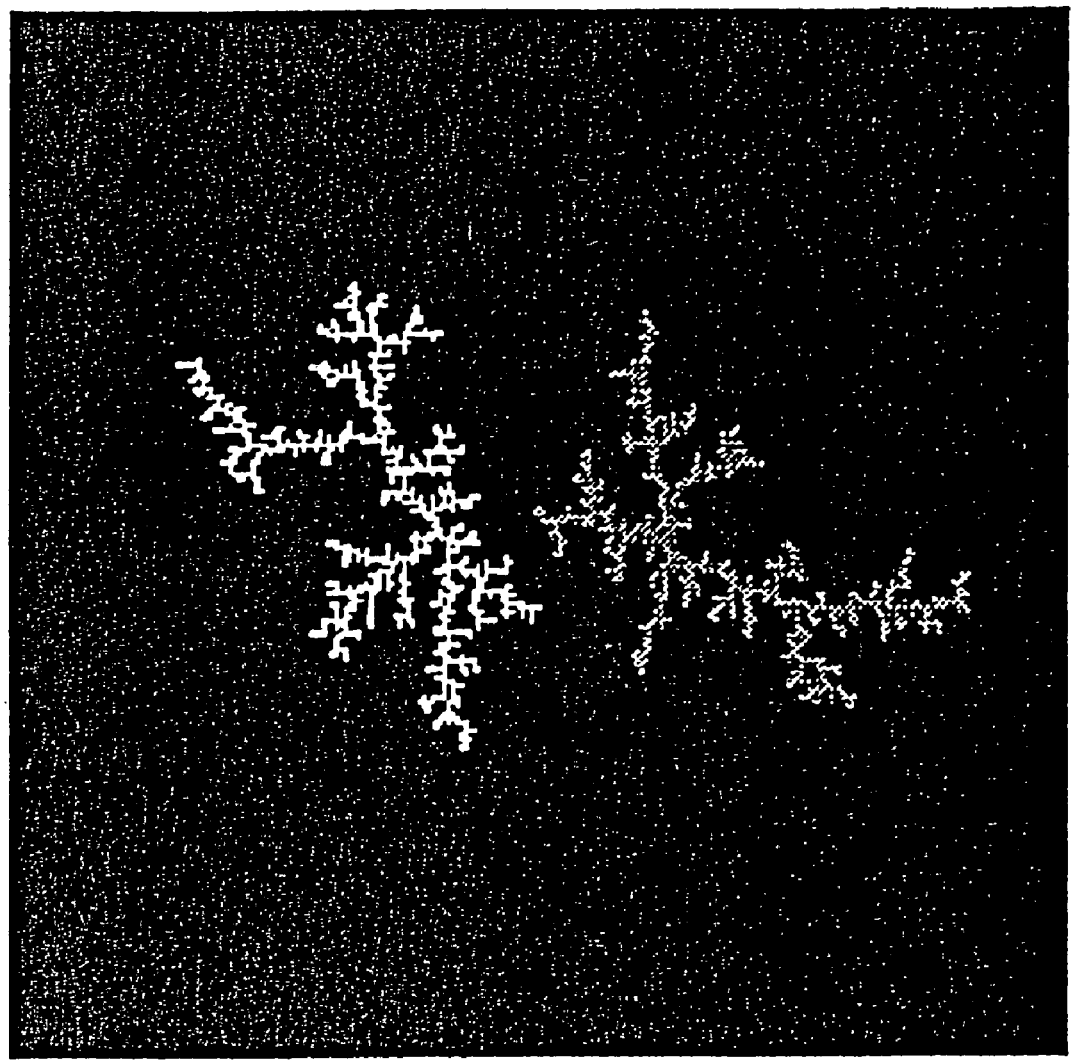
FIG. 7 is a schematic diagram that shows a result of simulation for fabricating a neural network according to the invention.

Explained below is a specific example of the method of fabricating a neural network based on the model shown in (2) above. One of results of simulation is shown in FIG. 1. In this simulation, $(\alpha, \beta) = (0.5, 1.0)$ was used, and 4000-step growth from four sites was conducted. In FIG. 2, using the same $(\alpha, \beta)$, 3000-step growth from three sites was conducted. By changing parameters, various figures can be created. If $\alpha$ corresponding to the growth material transported from a remote site is large, then respective elements tend to spread. If $\beta$ corresponding to the adhesive substance nearby is large, the coupling becomes dense. Figures upon executing 2000-step growth from two sites by changing ($\alpha$, $\beta$) are shown in FIGS. 3 through 7. In FIG. 3, similarly to the above two examples, $(\alpha, \beta) = (0.5, 1.0)$ was used. Examples increasing $\beta$ from that are shown in FIGS. 4 through 6. $(\alpha, \beta) = (0.5, 1.5)$ was used in FIG. 4, $(\alpha, \beta) = (0.5, 2.0)$ was used in FIG. 5, and $(\alpha, \beta) = (0.5, 2.5)$ was used in FIG. 6, respectively. It is appreciated that the coupling becomes dense as $\beta$ increases. On the other hand, if the relation in value between $\alpha$ and $\beta$ is reversed, growth tends to proceed spreading remoter as shown in FIG. 7 [$(\alpha, \beta) = (1.0, 0.5)$]. In this manner, by changing the parameters $\alpha$ and $\beta$, various neural network structures can be produced while controlling properties of figures.

(3) Extended Interacting Fractals

Extended interacting fractals, i.e. a coupled-fractal network, are defined below. As an example, fractals made up of $N_c$ species are taken on a tetragonal lattice S in a two-dimensional space. A scalar potential field $\phi(i, j)$ is defined on a lattice site $(i, j) \in S$, and this is called a potential. Then, $\psi^{(1)}(i, j), \psi^{(2)}(i, j), \ldots, \psi^{(N_c)}(i, j)$ are also defined. They satisfy the differential equations:

$$\Delta\phi^{(1)}(i,j)=0 \qquad (23)$$

$$\Delta\psi^{(1)}(i,j)=0 \qquad (24)$$

$$\Delta\psi^{(2)}(i,j)=0 \qquad (25)$$

$$\vdots$$

$$\Delta\psi^{(N_c)}(i,j)=1 \qquad (26)$$

The figure $T_n$ defined therefrom is a set of lattice sites on a two-dimensional lattice, and respective lattice sites are classified into $N_c$ species. That is, $$T_n = \bigcup_{j=1}^{N_c} Q_n^{(j)} \qquad (27)$$

and respective species are exclusive from each other. That is, $$Q_n^{(j)} \cap Q_n^{(k)} = \emptyset \text{ if } j \neq k \qquad (28)$$

$Q_0^{(k)}$ consists of a single lattice site $(i_{ini}^{(k)}, j_{ini}^{(k)})$ exclusively, and $T_{n+1}$ is created by sequentially adding one lattice site to $T_n$ by the following rule. First, Equation (23) is solved under the boundary conditions:

$$\phi(i,j)=0 \text{ when } (i,j) \to \infty \qquad (29)$$

$$\phi(i,j)=1 \text{ when } (i,j) \in T_n \qquad (30)$$

and potential of each lattice site is determined. Further, Equations (24) through (26) are solved under the boundary conditions:

$$\psi^{(k)}(i,j)=\psi\infty \text{ when } (i,j) \to \infty \qquad (31)$$

$$\psi^{(k)}(i,j)=1 \text{ when } (i,j) \in Q_n^{(k)} \qquad (32)$$

$$\psi^{(k)}(i,j)=-1 \text{ when } (i,j) \in Q_n^{(l)} (k \neq l) \qquad (33)$$

and $\psi^{(k)}(i,j)$ is determined. The lattice site to be added to $T_n$ to form $T_{n-1}$ is not included in $T_n$, and it is selected from a set $U_n^{(k)}$ of lattice sites closest to $Q_n^{(k)}$.

The number of lattice sites contained in $U_n^{(k)}$ is written as $N_n^{(k)}$. That is, the lattice site to be added to $T_n$ is selected from the following set:

$$U_n = \bigcup_{k=1}^{N_c} U_n^{(k)} \qquad (34)$$

and the number of lattice sites contained in the set, i.e. the number of candidates, is:

$$N_n = \sum_{k=1}^{N_c} N_n^{(k)} \qquad (35)$$

For each site $(i_m^{(k)}, j_m^{(k)})$ contained in $U_n^{(k)}$ intensity of its electric field is defined as:

$$E_m^{(k)}(\alpha,\beta) = |\phi(i_m^{(k)}, j_m^{(k)}) - 1|^\alpha \times |\psi^{(k)}(i_m^{(k)}, j_m^{(k)}) - 1|^\beta \qquad (36)$$

The probability that $(i_n^{(k)}, j_m^{(k)})$ in $U_n$ is selected is proportional to intensity of its electric field $E_m^{(k)}(\alpha,\beta)$. That is, the probability is:

$$p_m^{(k)}(\alpha, \beta) = \frac{1}{\Delta} E_m^{(k)}(\alpha, \beta) \qquad (37)$$

$$\Delta = \sum_{k=1}^{N_c} \sum_{j=1}^{N_n^{(k)}} E_j^{(k)}(\alpha, \beta) \qquad (38)$$

By repeating the above-mentioned procedures, $T_n$ is formed progressively.

In the above model, the model explained in (2) is expanded in the portion of the boundary condition $\psi^{(k)}(i,j) = \psi\infty$ of $\psi^{(k)}(i,j)$. That is, by limitation of $\psi\infty = 0$, the above model results in the model of (2).

Figure 8:
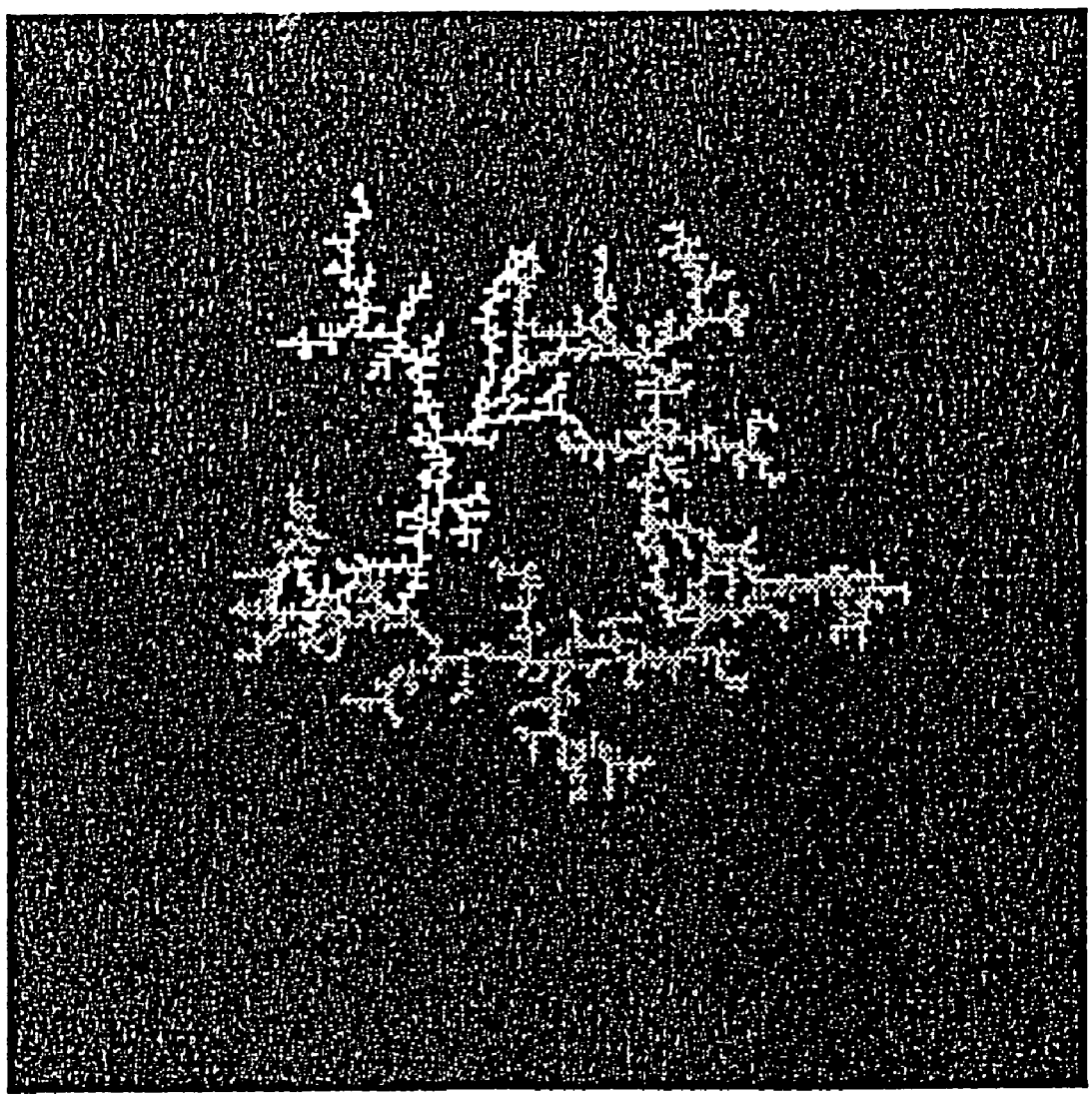
FIG. 8 is a schematic diagram that shows a result of simulation for fabricating a neural network according to the invention.
Figure 9:
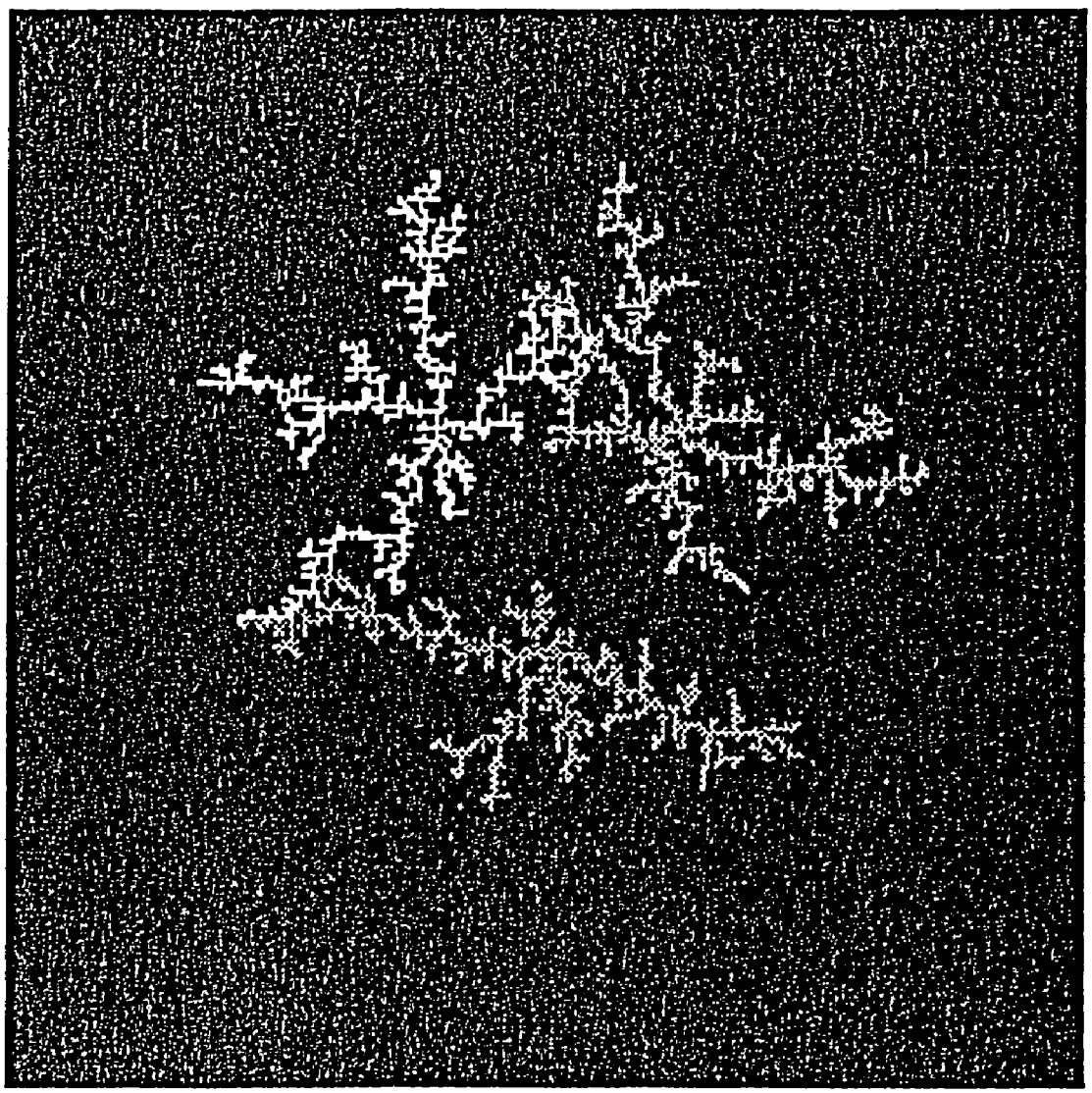
FIG. 9 is a schematic diagram that shows a result of simulation for fabricating a neural network according to the invention.
Figure 10:
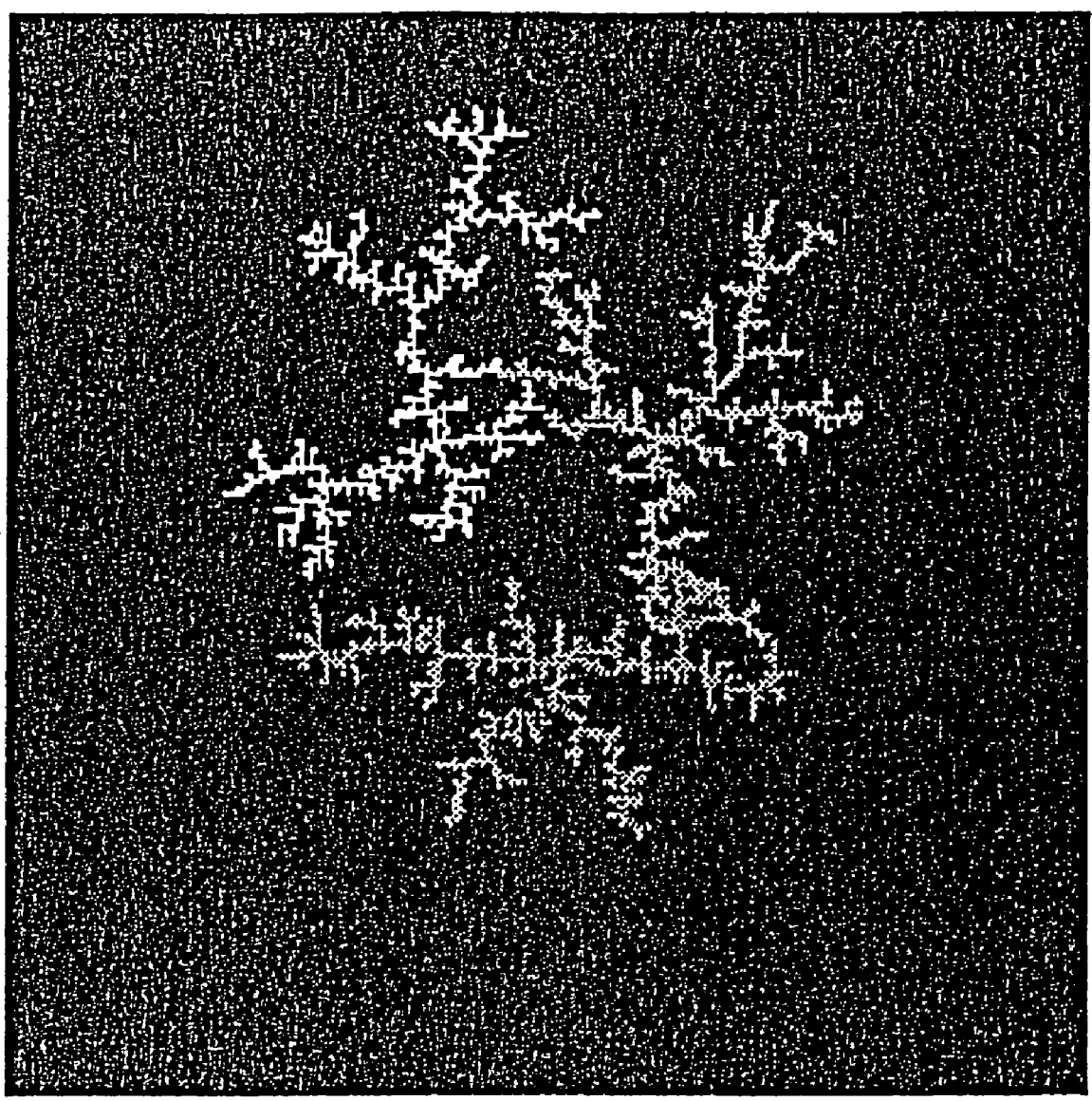
FIG. 10 is a schematic diagram that shows a result of simulation for fabricating a neural network according to the invention.
Figure 11:
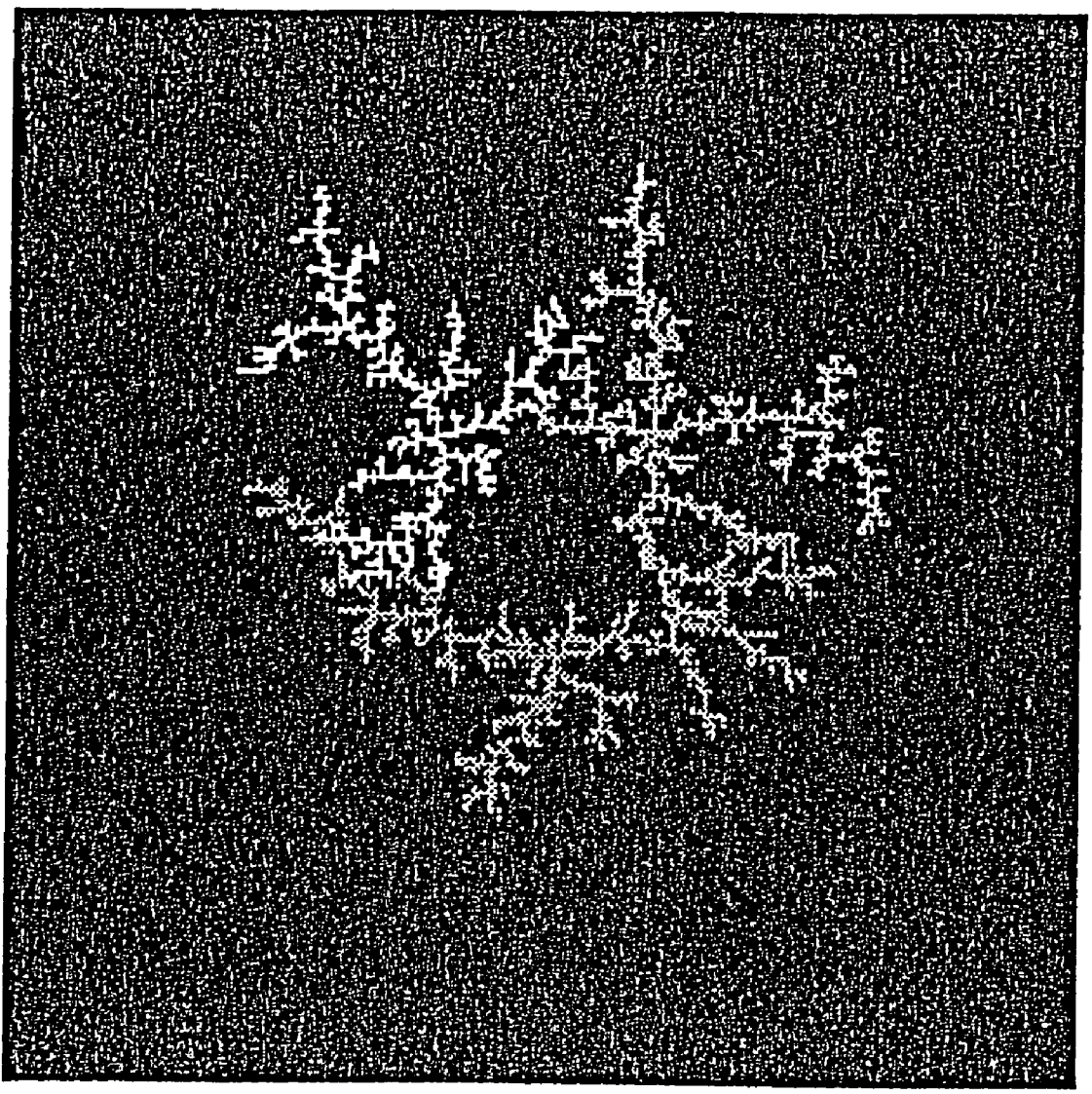
FIG. 11 is a schematic diagram that shows a result of simulation for fabricating a neural network according to the invention.

Explained below is a specific example of the method for fabricating a neural network based on the model in (3) above. Results of simulations are shown in FIGS. 8 through 14. In these simulations, $(\alpha, \beta) = (0.5, 1.0)$ was used, and 3000-step growth from three sites was conducted. FIG. 8 shows a case of growth under the boundary condition of $\psi\infty = 0$, and it is the same as (2) above. $\psi\infty = -1$ was used in FIG. 9, $\psi\infty = -0.6$ was used in FIG. 10, and $\psi\infty = -0.2$ was used in FIG. 11.

Figure 12:
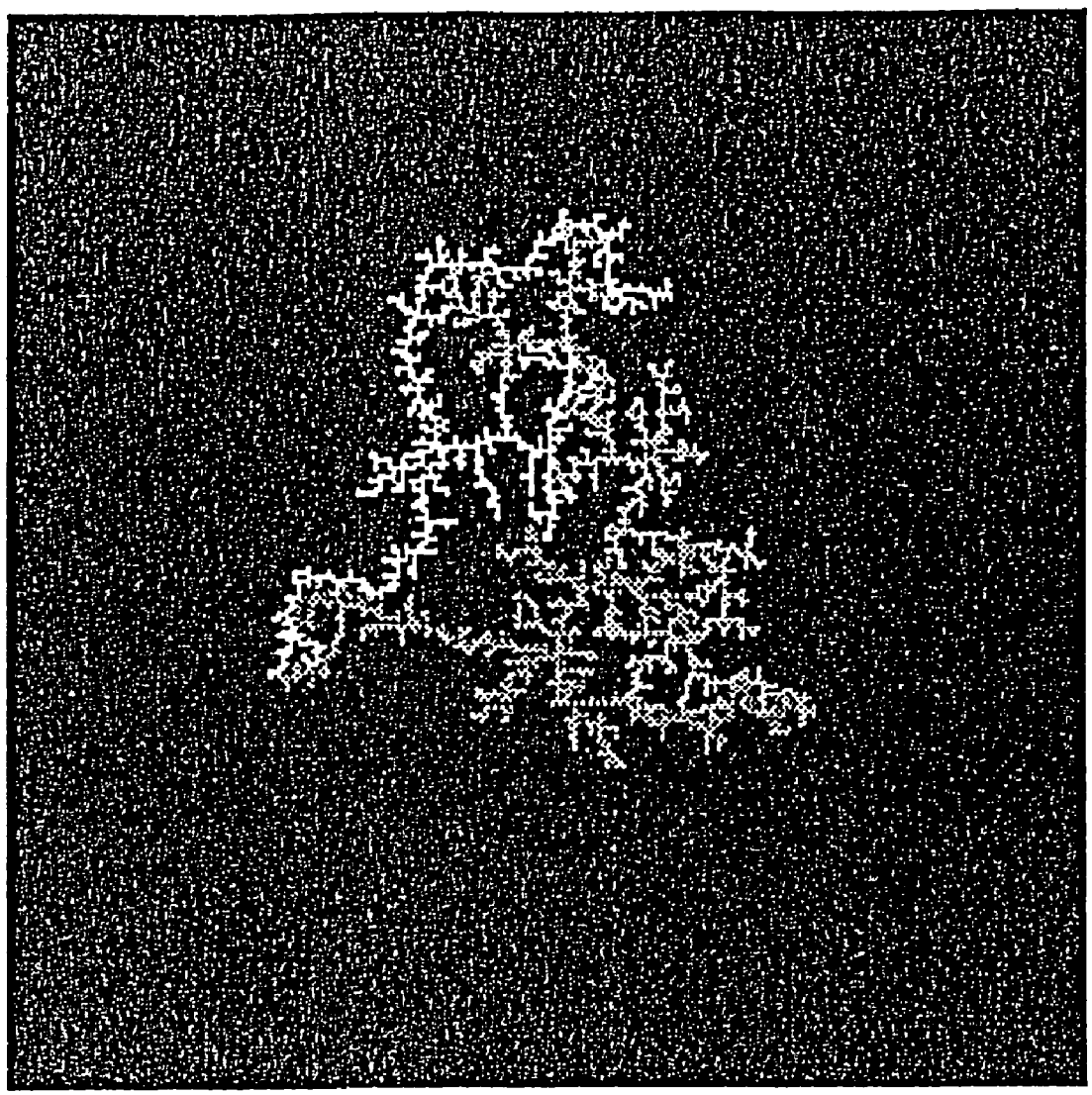
FIG. 12 is a schematic diagram that shows a result of simulation for fabricating a neural network according to the invention.
Figure 13:
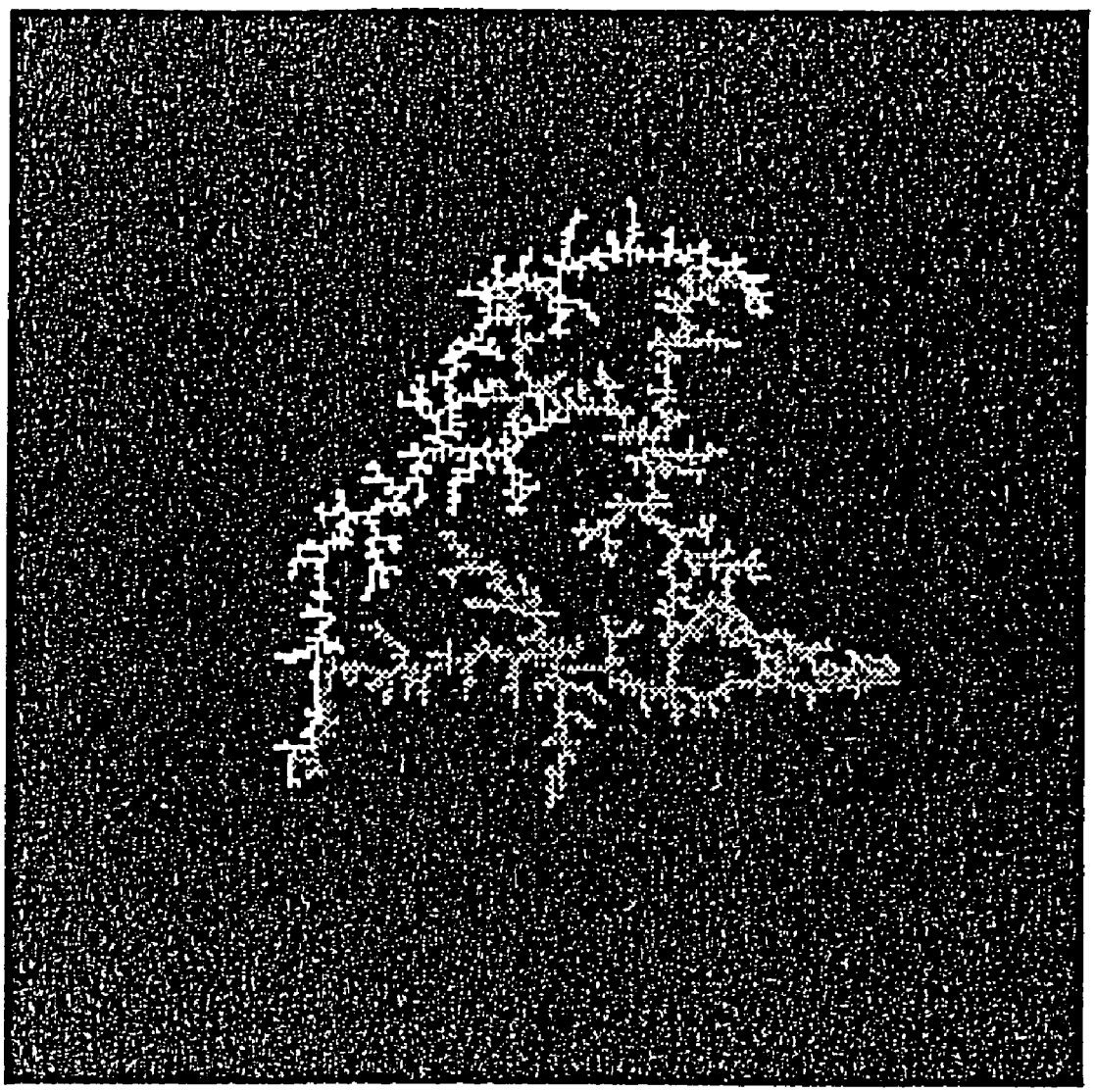
FIG. 13 is a schematic diagram that shows a result of simulation for fabricating a neural network according to the invention.
Figure 14:
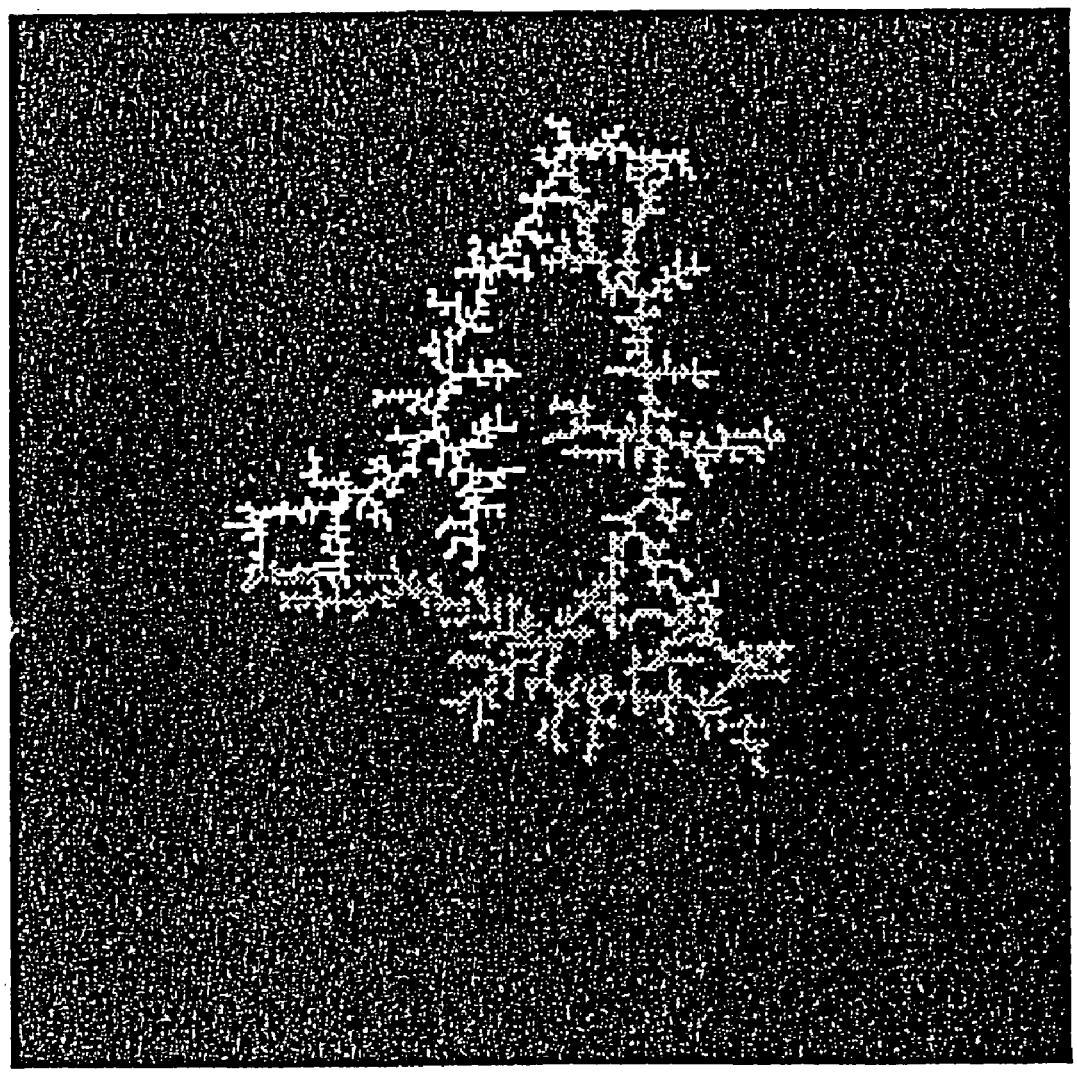
FIG. 14 is a schematic diagram that shows a result of simulation for fabricating a neural network according to the invention.
Figure 15:
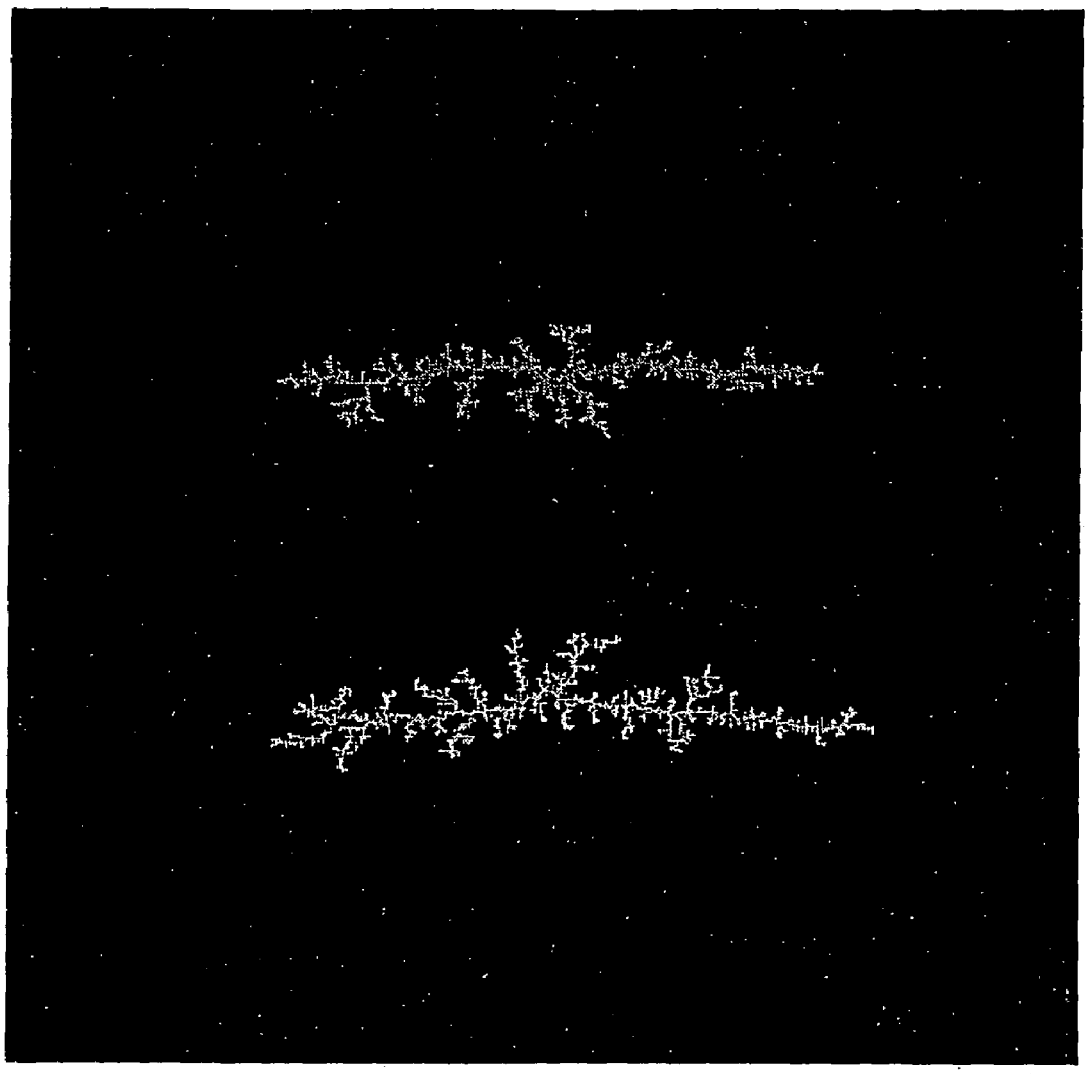
FIG. 15 is a schematic diagram that shows a result of simulation for fabricating a neural network according to the invention.
Figure 16:
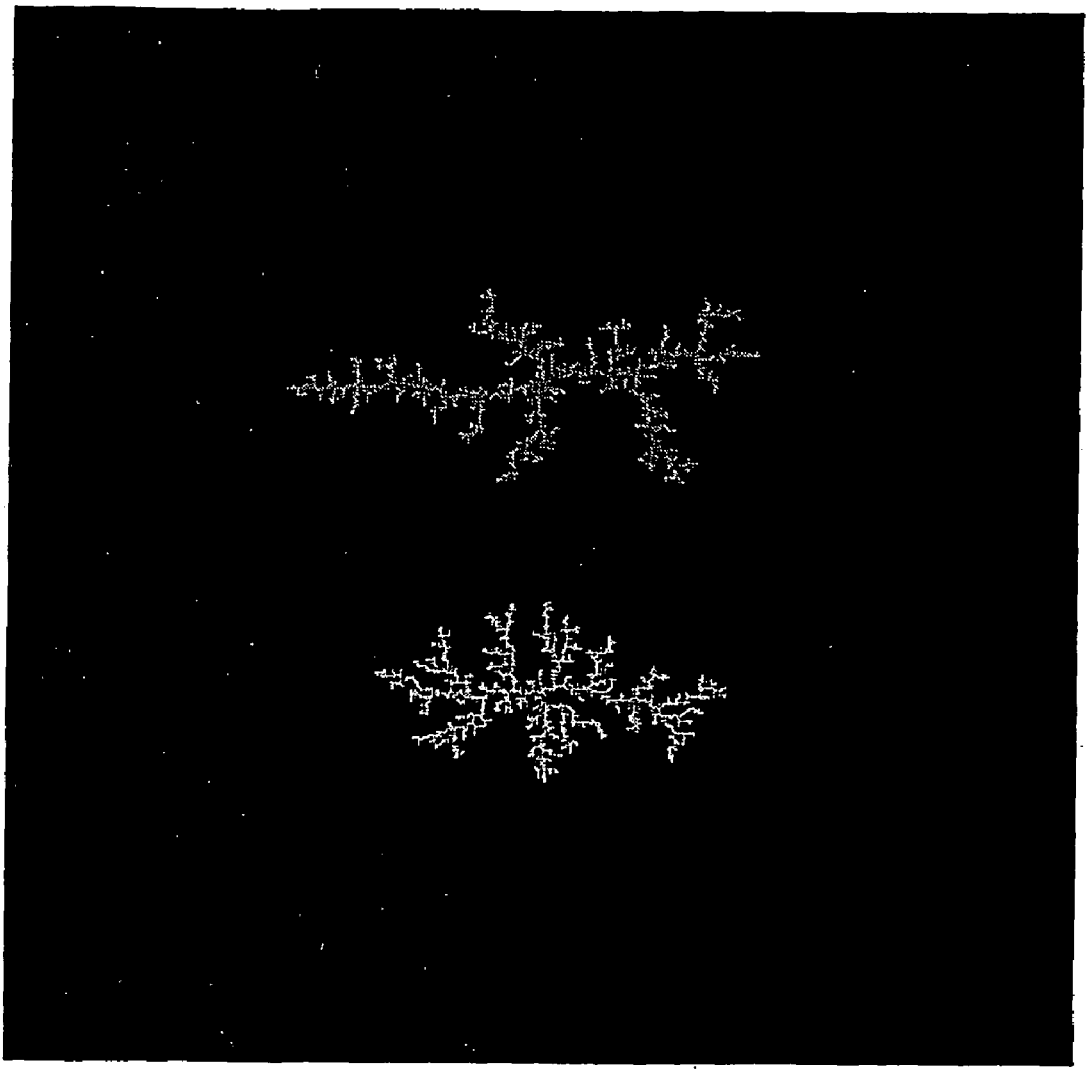
FIG. 16 is a schematic diagram that shows a result of simulation for fabricating a neural network according to the invention.
Figure 16:
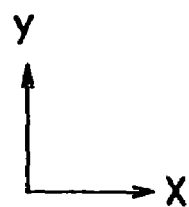
Figure 17:
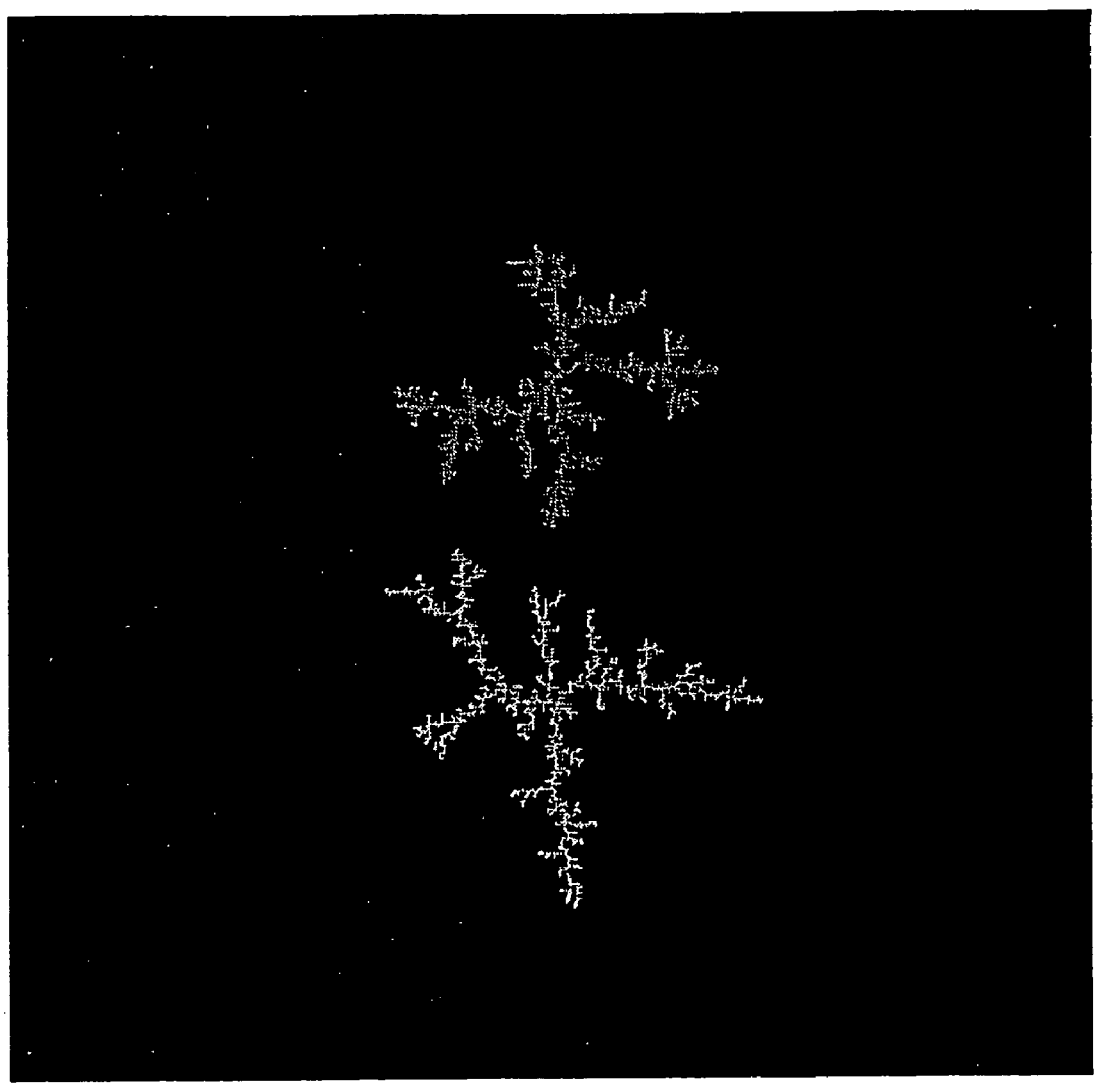
FIG. 17 is a schematic diagram that shows a result of simulation for fabricating a neural network according to the invention.
Figure 18:
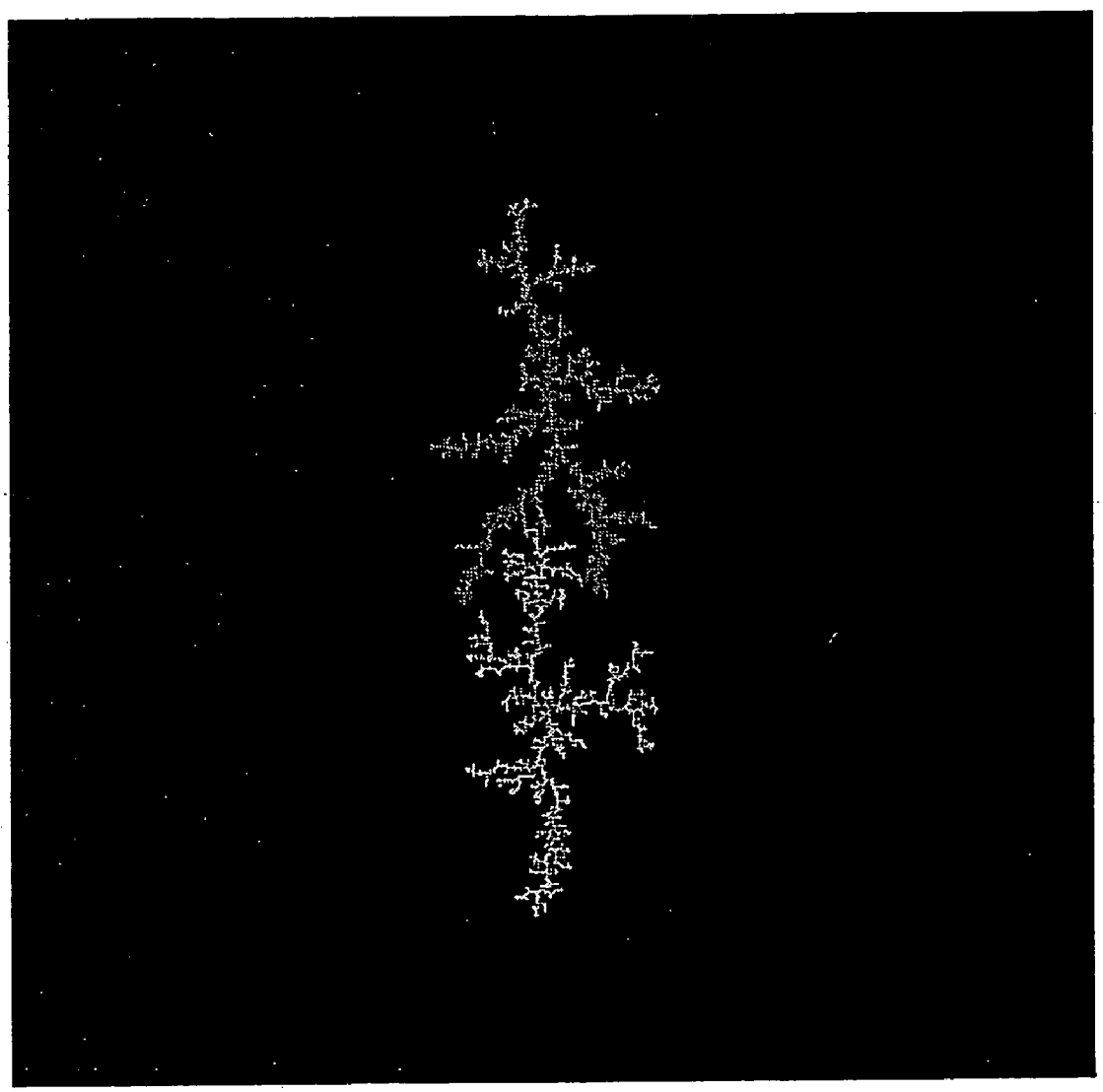
FIG. 18 is a schematic diagram that shows a result of simulation for fabricating a neural network according to the invention.
Figure 19:
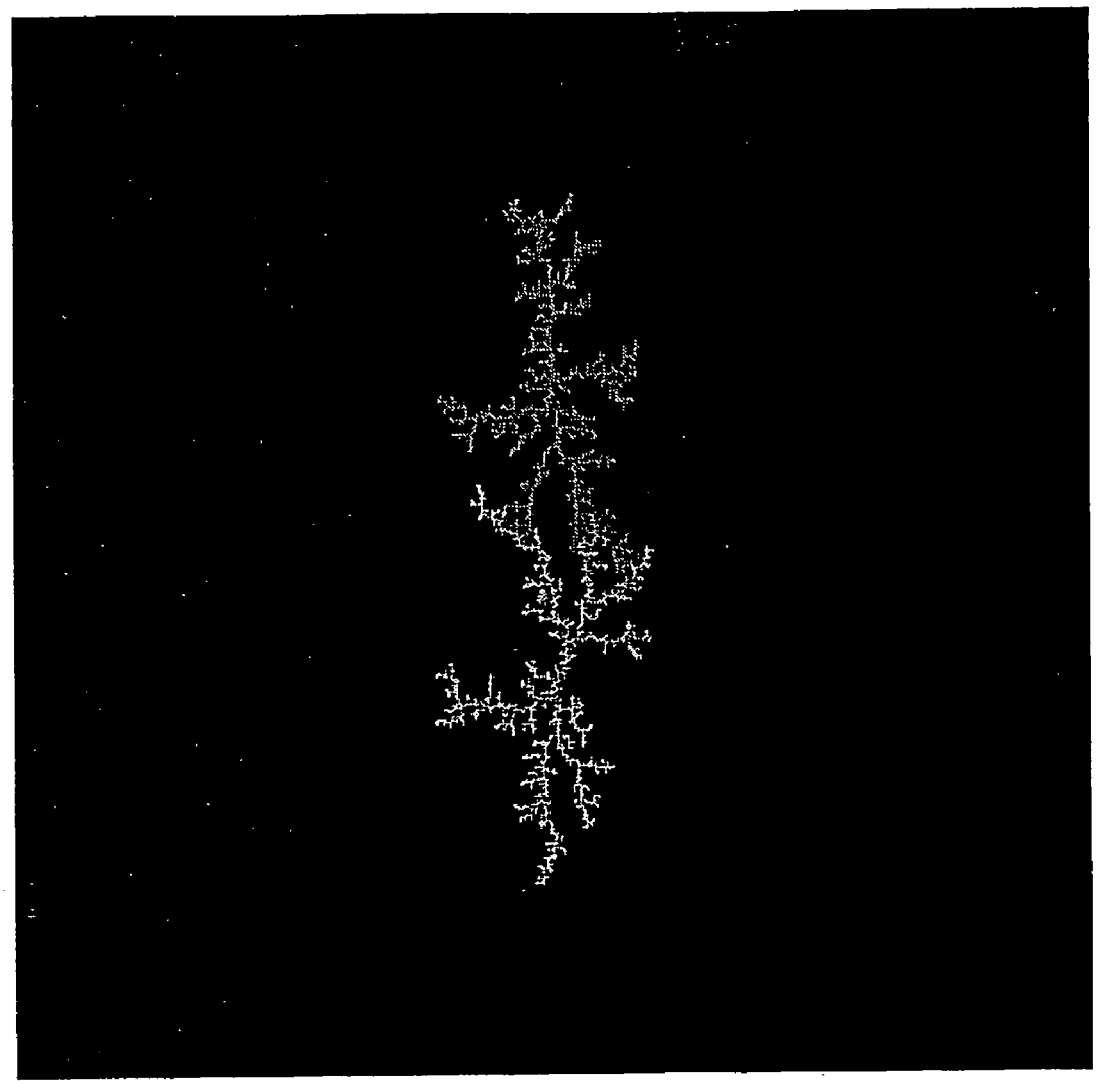
FIG. 19 is a schematic diagram that shows a result of simulation for fabricating a neural network according to the invention.
Figure 20:
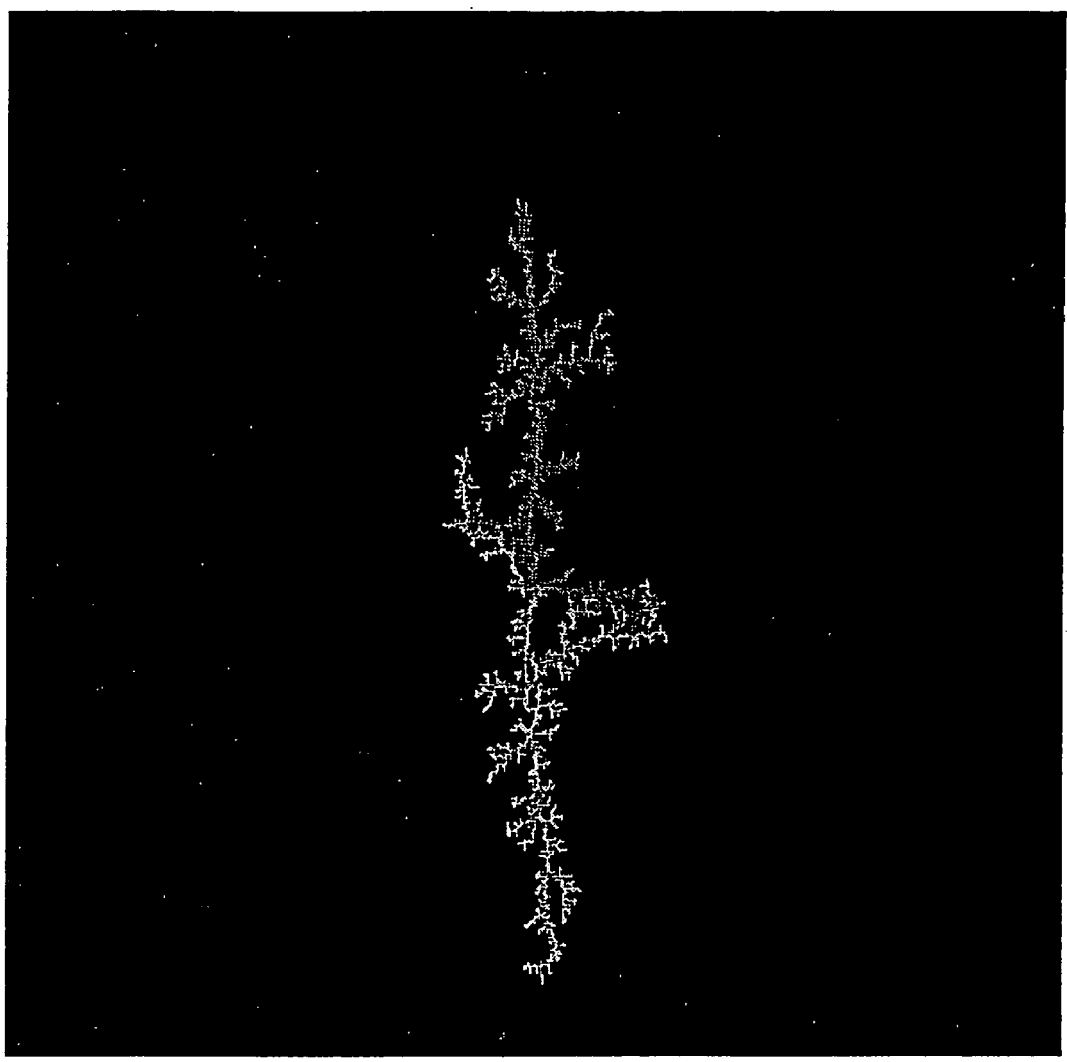
FIG. 20 is a schematic diagram that shows a result of simulation for fabricating a neural network according to the invention.

In case that $\psi\infty$ is negative, the potential difference between fractal figures belonging to species other than itself and a site at infinity becomes smaller, and the interaction among fractal figures becomes weaker. On the other hand, FIGS. 12 through 14 show those in which $\psi\infty$ is a positive value. $\psi\infty = 0$ was used in FIG. 12, $\psi\infty = 0.6$ was used in FIG. 13, and $\psi\infty = 0.2$ was used in FIG. 14.

In case of $\psi\infty > 0$, in contrast, interaction among fractal figures becomes stronger, and a shape massed more densely is obtained.

(4) Extended Interacting Fractals Introducing Anisotropy

Extended interacting fractals introducing anisotropy, i.e. a coupled-fractal network, are defined below. As an example, fractals made up of $N_c$ species are taken on a tetragonal lattice S in a two-dimensional space. Regarding S as an anisotropic field, an anisotropic parameter tensor $M=(m_{\mu, \nu})$, $L=(l_{\mu, \nu})$ is introduced here. A scalar potential field $\phi_M(i, j)$ is defined on a lattice site $(i, j) \epsilon S$, and this is called a potential. Then, $\psi_L^{(1)}(i,j), \psi_L^{(2)}, \ldots, \psi_L^{(N_c)}(i,j)$ are also defined. They satisfy the differential equations:

$$\sum_{\mu,\nu=x,y} \frac{\partial}{\partial r_\mu} \frac{1}{m_{\mu,\nu}} \frac{\partial}{\partial r_\nu} \phi_M(i, j) = 0 \qquad (61)$$

$$\sum_{\mu,\nu=x,y} \frac{\partial}{\partial r_\mu} \frac{1}{l_{\mu,\nu}} \frac{\partial}{\partial r_\nu} \psi_L^{(1)}(i, j) = 0 \qquad (62)$$

$$\sum_{\mu,\nu=x,y} \frac{\partial}{\partial r_\mu} \frac{1}{l_{\mu,\nu}} \frac{\partial}{\partial r_\nu} \psi_L^{(2)}(i, j) = 0 \qquad (63)$$

$$\sum_{\mu,\nu=x,y} \frac{\partial}{\partial r_\mu} \frac{1}{l_{\mu,\nu}} \frac{\partial}{\partial r_\nu} \psi_L^{(N_c)}(i, j) = 0 \qquad (64)$$

Here $$\frac{\partial}{\partial r_\mu}$$

represents a difference on the lattice site, and for example, $$\frac{\partial \phi_M(i, j)}{\partial r_x} = \frac{\phi_M(i+1, j) - \phi_M(i, j)}{(i+1) - i} \qquad (65)$$

The figure $T_n$ defined therefrom is a set of lattice sites on a two-dimensional lattice, and respective lattice sites are classified into $N_c$ species. That is, $$T_n = \bigcup_{p=1}^{N_c} Q_n^{(p)} \qquad (66)$$

and respective species are exclusive from each other. That is, $$Q_n^{(p)} \cap Q_n^{(q)} = 0, \text{ if } p \neq q \qquad (67)$$

$Q_0^{(p)}$ consists of a single lattice site $(i_{ini}^{(p)}, j_{ini}^{(p)})$ exclusively, and $T_{n+1}$ is created by sequentially adding one lattice site to $T_n$ by the following rule. First, Equation (61) is solved under the boundary conditions:

$$\phi_M(i,j)=0 \text{ when } (i,j) \to \infty \qquad (68)$$

$$\phi_M(i,j)=1 \text{ when } (i,j) \epsilon T_n \qquad (69)$$

and potential of each lattice site is determined. Further, Equations (62) through (64) are solved under the boundary conditions:

$$\psi_L^{(p)}(i,j)=\psi\infty \text{ when } (i,j) \to \infty \qquad (70)$$

$$\psi_L^{(p)}(i,j)=1 \text{ when } (i,j) \epsilon Q_n^{(p)} \qquad (71)$$

$$\psi_L^{(p)}(i,j)=-1 \text{ when } (i,j) \epsilon Q_n^{(q)}(p \neq q) \qquad (72)$$

and $\psi_L^{(p)}(i,j)$ is determined. The lattice site to be added to $T_n$ to form $T_{n+1}$ is not included in $T_n$, and it is selected from a set $U_n^{(p)}$ of lattice sites closest to $Q_n^{(p)}$.

The number of lattice sites contained in $U_n^{(p)}$ is written as $N_n^{(p)}$. That is, the lattice site to be added to $T_n$ is selected from the following set:

$$U_n = \bigcup_{p=1}^{N_c} U_n^{(p)} \qquad (73)$$

and the number of lattice sites contained in the set, i.e. the number of candidates, is:

$$N_n = \sum_{p=1}^{N_c} N_n^{(p)} \qquad (74)$$

For each site $(i_m^{(p)}, j_m^{(p)})$ (m=1, 2, ..., $N_n^{(p)}$) contained in $U_n^{(p)}$, intensity of its electric field is defined as:

$$E_m^{(p)}(\alpha,\beta,M,L) = |\psi_M(i_m^{(p)},j_m^{(p)}) - 1|^\alpha \times |\psi_L^{(p)}(i_m^{(p)},j_m^{(p)}) - 1|^\beta \qquad (75)$$

The probability that a site $(i_m^{(p)}, j_m^{(p)})$ in $U_n$ is selected is proportional to intensity of its electric field $E_m^{(p)}(\beta, \beta, M, L)$. That is, the probability is:

$$P_m^{(p)}(\alpha, \beta, M, L) = \frac{1}{\Delta} E_m^{(p)}(\alpha, \beta, M, L) \qquad (76)$$

$$\Delta = \sum_{p=1}^{N_c} \sum_{m=1}^{N_n^{(p)}} E_m^{(p)}(\alpha, \beta, M, L) \qquad (77)$$

By repeating the above-mentioned procedures, $T_n$ is formed progressively.

The above model has been extended from (3) above as a result of introduction of anisotropic parameters in Equations (61) through (64). By limitation of $m_{\mu,\nu} = m\delta_{\mu,\nu}$, $l_{\mu,\nu1} = l\delta_{\mu,\nu}$ (m, l=const.) the above model results in the model of (3).

Explained below is a specific example of the method for fabricating a neural network based on the model in (4) above. Results of simulations are shown below. First shown is how the coupled-fractal changed. For easier understanding, anisotropy is introduced in only one direction on a two-dimensional lattice (in this case, in the y-axis direction on an x-y plane. That is, $$M = \begin{pmatrix} 1 & 0 \\ 0 & m \end{pmatrix}, L = \begin{pmatrix} 1 & 0 \\ 0 & l \end{pmatrix} \qquad (78)$$

Figure 21:
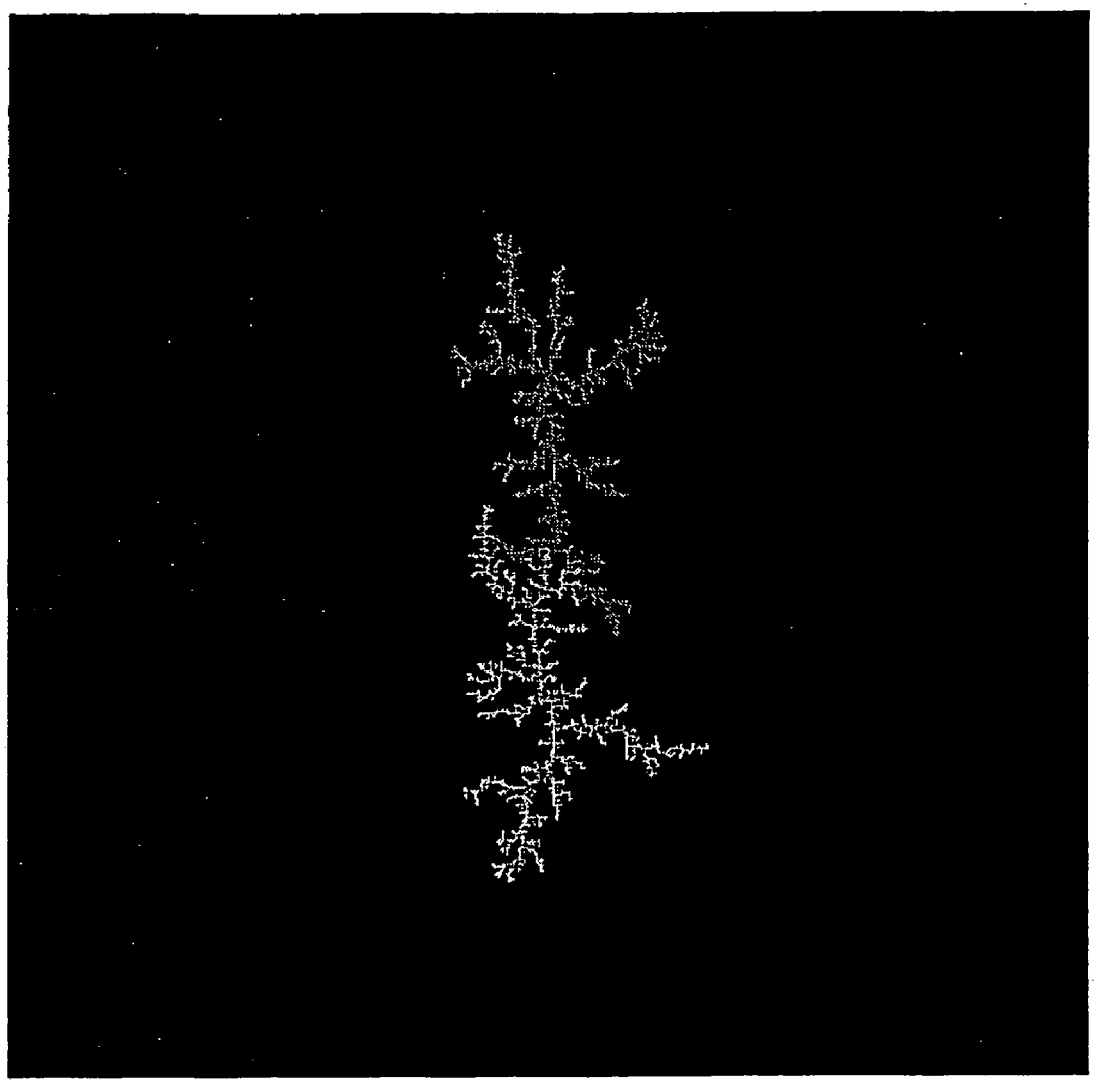
FIG. 21 is a schematic diagram that shows a result of simulation for fabricating a neural network according to the invention.
Figure 22:
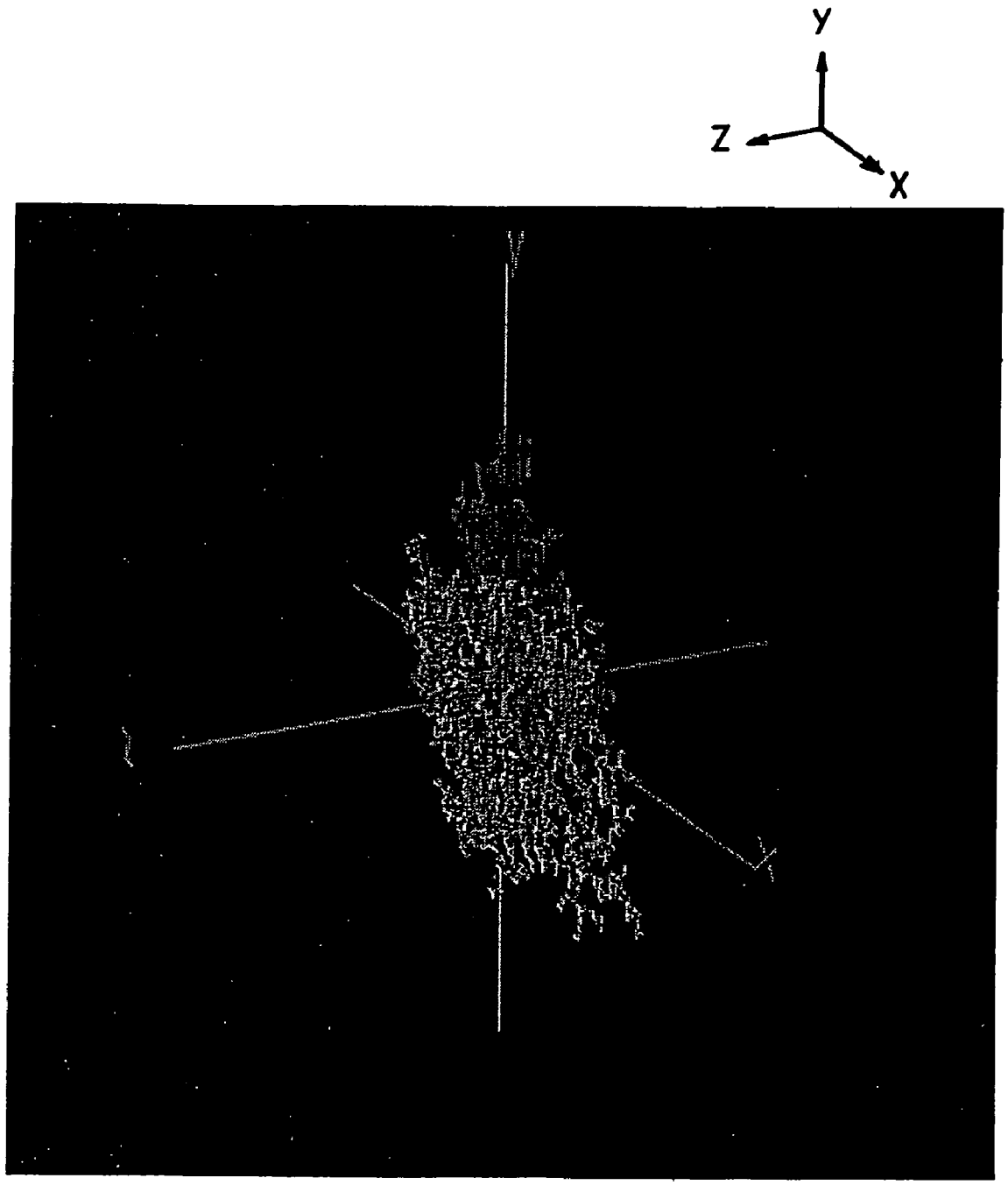
FIG. 22 is a schematic diagram that shows a result of simulation for fabricating a neural network according to the invention.
Figure 23:
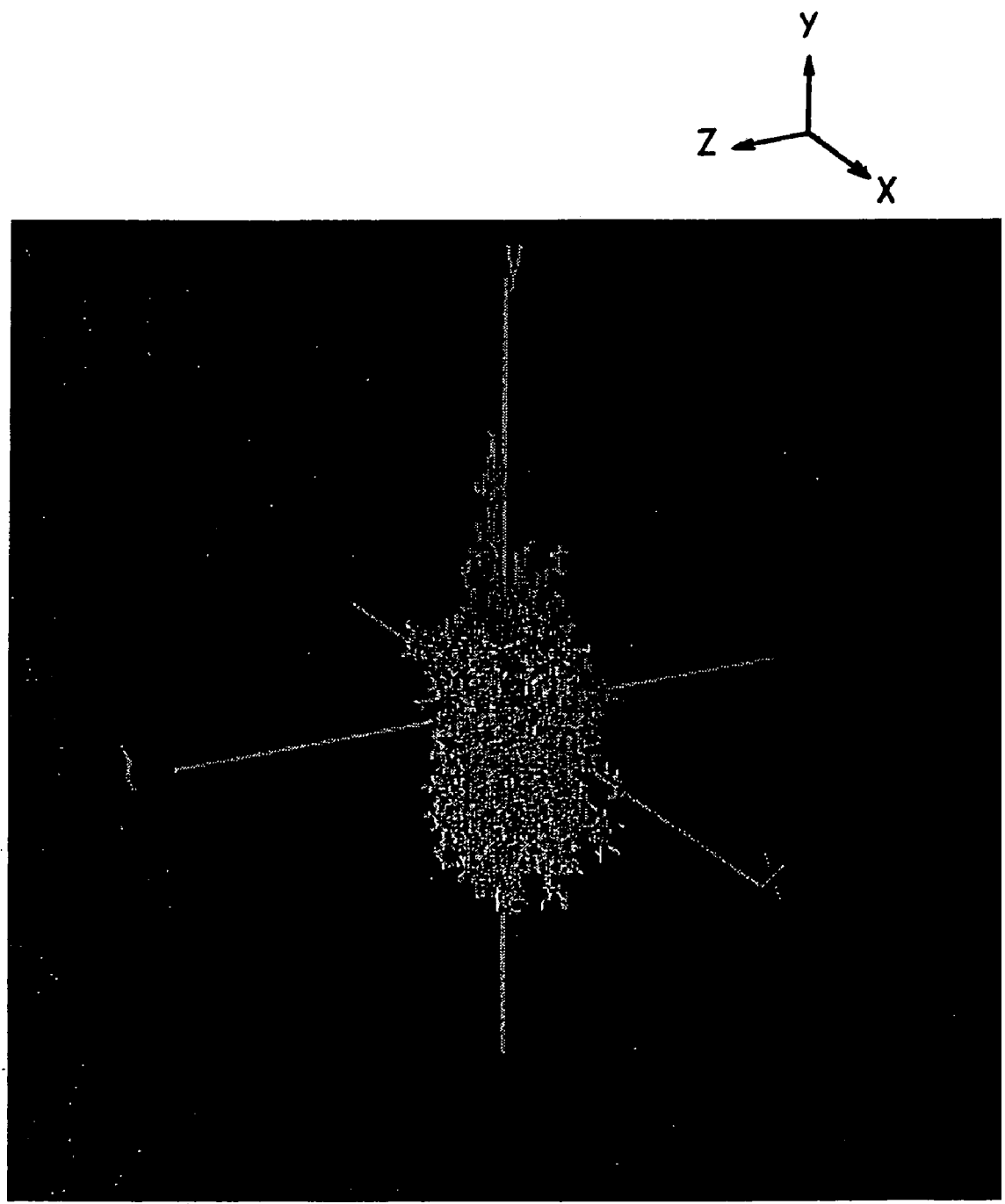
FIG. 23 is a schematic diagram that shows a result of simulation for fabricating a neural network according to the invention.
Figure 24:
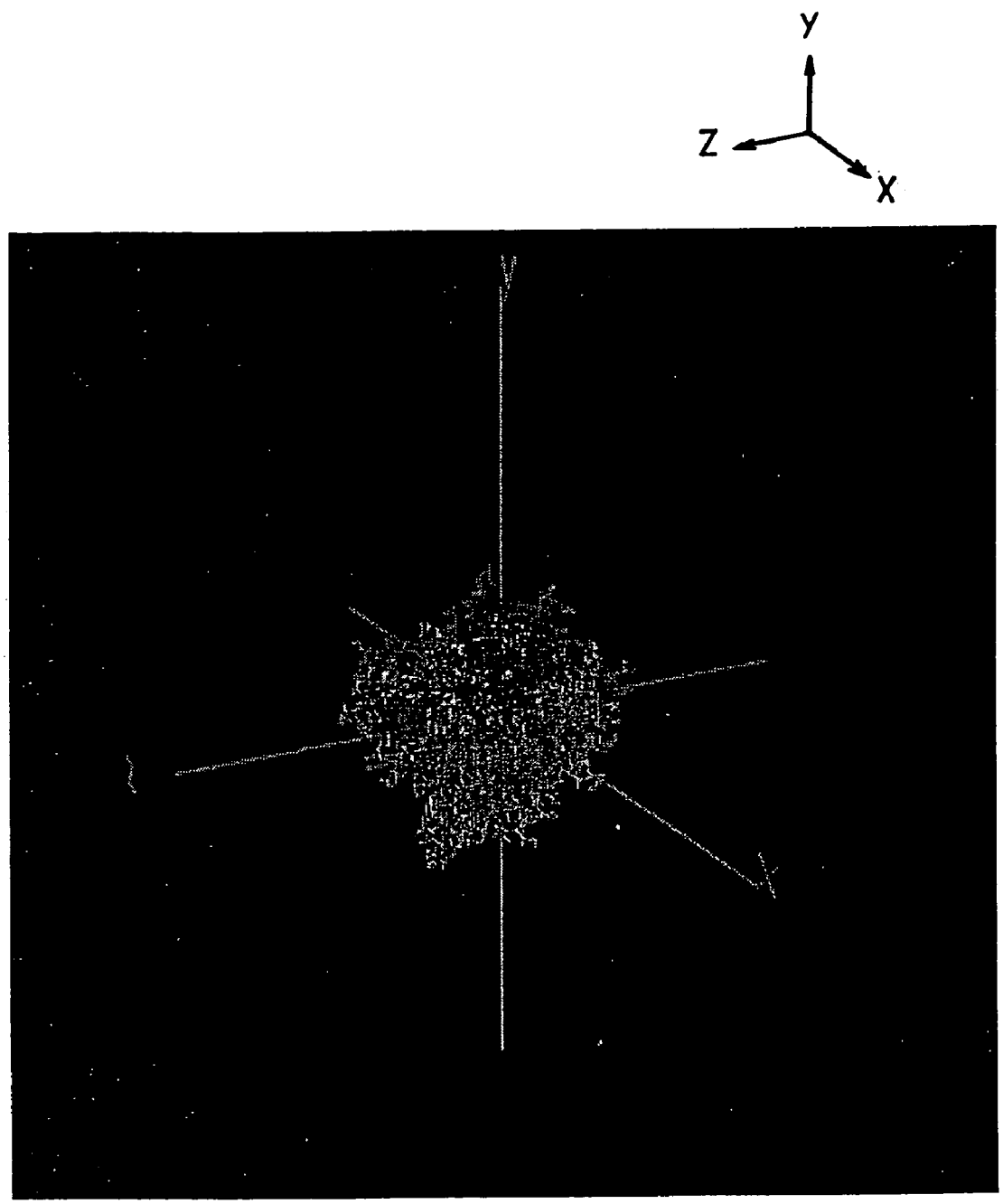
FIG. 24 is a schematic diagram that shows a result of simulation for fabricating a neural network according to the invention.
Figure 25:
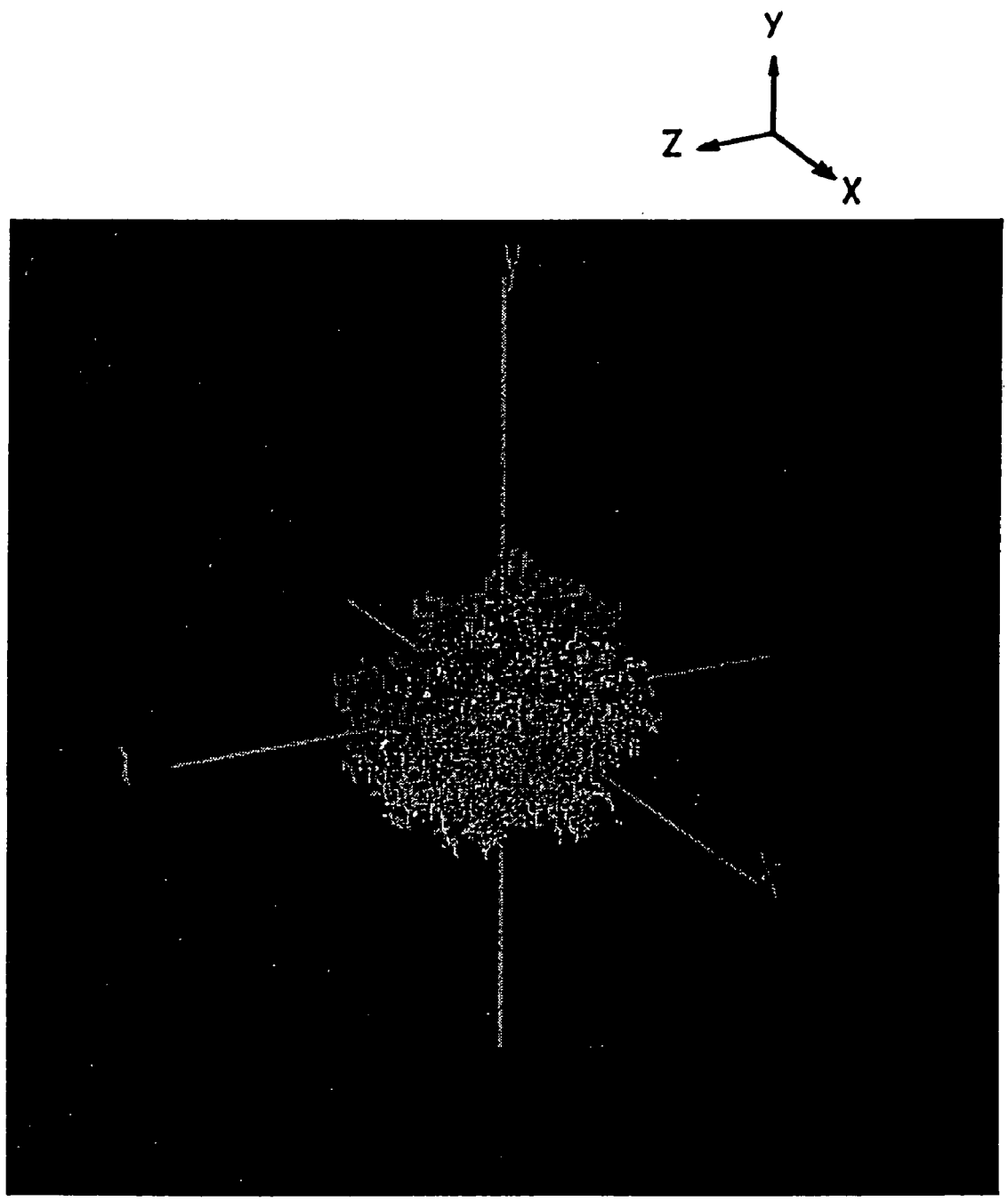
FIG. 25 is a schematic diagram that shows a result of simulation for fabricating a neural network according to the invention.
Figure 26:
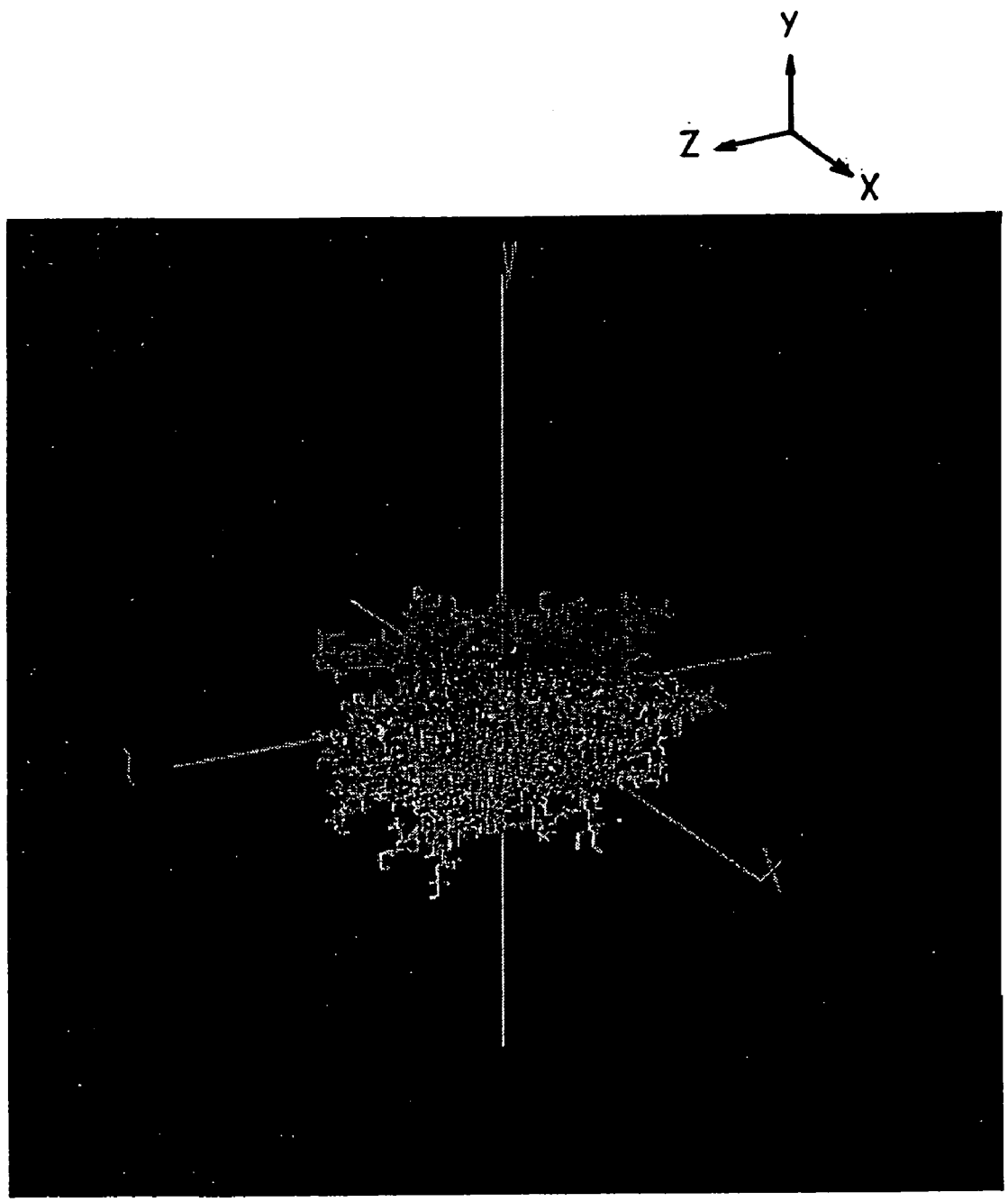
FIG. 26 is a schematic diagram that shows a result of simulation for fabricating a neural network according to the invention.

While fixing the parameters as $(\alpha, \beta)=(0.5, 1.0)$ and $\psi_\infty=0$, 4000-step growth was conducted from two sites on the y-axis. FIGS. 15 through 20 are coupled-fractal figures upon m=l=0.5, m=l=0.75, m=l=1.0, m=l=1.25, m=l=1.5 and m=l=2, respectively. It is appreciated from these figures that as m and l increase, the coupled-fractal figure tends to extend in the y-axis direction (growth in the y-axis direction is promoted) and that as m and l decrease, the coupled-fractal figure tends to extend in the x-axis direction (growth in the y-axis direction is restricted). It is further known from these structural changes that the number of adjacent sites among different fractal figures changes. More specifically, in the figure shown in FIGS. 15 through 17, there are no adjacent sites between every two fractal figures. However, adjacent sites gradually increase from six in FIG. 18, through 57 in FIGS. 19 to 95 in FIG. 20, for example. In this manner, by changing anisotropic parameters, the coupling mode among a plurality of fractal figures can be changed. FIG. 21 shows a figure as a result of growth at different values of m=0.5 and l=2.0. It is appreciated from it that influences of the anisotropic parameter l introduced into $\psi$ are larger than influences of the anisotropic parameter m introduced into $\phi$. As readily understood from the fact that the coupling strength changes, the method by this model is not mere spatial expansion and contraction, but it is an improvement by anisotropy of growth algorithm introduced absolutely first.

(5) Extended Interacting Fractals Introducing Anisotropy in a Three-Dimensional Space Extended interacting fractals, i.e. a coupled-fractal network, developed from the model in (4) above and introducing anisotropy in a three-dimensional space is introduced. Fractals made up of $N_c$ species are taken on a tetragonal lattice S in a two-dimensional space. Regarding S as an anisotropic field, an anisotropic parameter tensor:

$$M=(m_{\mu,\nu}), L=(l_{\mu,\nu})$$

is introduced here. A scalar potential field $\phi_m(i, j, k)$ is defined on a lattice site $(i, j, k) \in S$, and this is called a potential. Then, $\omega_L^{(1)}(i,j,k), \omega_L^{(2)}(i,j,k), \ldots, \psi_L^{(N_c)}(i,j,k)$ are also defined. They satisfy the differential equations:

$$\sum_{\mu,\nu=x,y,z} \frac{\partial}{\partial r_\mu} \frac{1}{m_{u,v}} \frac{\partial}{\partial r_\nu} \phi_M(i, j, k) = 0 \qquad (79)$$

$$\sum_{\mu,\nu=x,y,z} \frac{\partial}{\partial r_\mu} \frac{1}{l_{u,v}} \frac{\partial}{\partial r_\nu} \psi_L^{(1)}(i, j, k) = 0 \qquad (80)$$

$$\sum_{\mu,\nu=x,y,z} \frac{\partial}{\partial r_\mu} \frac{1}{l_{u,v}} \frac{\partial}{\partial r_\nu} \psi_L^{(2)}(i, j, k) = 0 \qquad (81)$$

$$\sum_{\mu,\nu=x,y,z} \frac{\partial}{\partial r_\mu} \frac{1}{l_{\mu,\nu}} \frac{\partial}{\partial r_\nu} \psi_L^{(N_c)}(i, j, k) = 0 \qquad (82)$$

Here, $$\frac{\partial}{\partial r_\mu}$$

represents a difference on the lattice site, and for example, $$\frac{\partial \phi_M(i, j, k)}{\partial r_x} = \frac{\phi_M(i+1, j, k) - \phi_M(i, j, k)}{(i+1) - i} \qquad (83)$$

The figure $T_n$ defined therefrom is a set of lattice sites on a two-dimensional lattice, and respective lattice sites are classified into $N_c$ species. That is, $$T_n = \bigcup_{p=1}^{N_c} Q_n^{(p)} \quad (84)$$

and respective species are exclusive from each other. That is, $$Q_n^{(p)} \cap Q_n^{(q)} = \emptyset, \text{ if } p \neq q. \quad (85)$$

$Q_0^{(p)}$ consists of a single lattice site $(i_{ini}^{(p)}, j_{ini}^{(p)}, k_{ini}^{(p)})$ exclusively, and $T_{n+1}$ is created by sequentially adding one lattice site to $T_n$ by the following rule. First, Equation (79) is solved under the boundary conditions:

$$\phi_M(i,j,k)=0 \text{ when } (i,j,k)\to\infty \quad (86)$$

$$\phi_M(i,j,k)=1 \text{ when } (i,j,k)\in T_n \quad (87)$$

and potential of each lattice site is determined. Further, Equations (80) through (82) are solved under the boundary conditions:

$$\psi_L^{(p)}(i,j,k)=\psi_\infty \text{ when } (i,j,k)\to\infty \quad (88)$$

$$\psi_L^{(p)}(i,j,k)=1 \text{ when } (i,j,k)\in Q_n^{(p)} \quad (89)$$

$$\psi_L^{(p)}(i,j,k)=-1 \text{ when } (i,j,k)\in Q_N^{(q)} (p\neq q) \quad (90)$$

and $\psi_L^{(p)}(i,j,k)$ is determined. The lattice site to be added to $T_n$ to form $T_{n+1}$ is not included in $T_n$, and it is selected from a set $U_n^{(p)}$ of lattice sites closest to $Q_n^{(p)}$.

The number of lattice sites contained in $U_n^{(p)}$ is written as $N_n^{(p)}$. That is, the lattice site to be added to $T_n$ is selected from the following set:

$$U_n = \bigcup_{p=1}^{N_c} U_n^{(p)} \quad (91)$$

and the number of lattice sites contained in the set, i.e. the number of candidates, is:

$$N_n = \sum_{p=1}^{N_c} N_n^{(p)} \quad (92)$$

For each site $(i_m^{(p)}, j_m^{(p)}, k_m^{(p)})$ (m=1, 2, ..., $N_n^{(p)}$) contained in $U_n^{(p)}$ intensity of its electric field is defined as:

$$E_m^{(p)}(\alpha,\beta,M,L)=|\phi_M(i_m^{(p)},j_m^{(p)},k_m^{(p)})-1|^\alpha \times |\psi_L^{(p)}(i_m^{(p)}, j_m^{(p)},k_m^{(p)})-1|^\beta \quad (93)$$

The probability that a site $(i_m^{(p)}, j_m^{(p)}, k_m^{(p)})$ in $U_n$ is selected is proportional to intensity of its electric field $E_m^{(p)}(\alpha,\beta,M,L)$. That is, the probability is:

$$P_m^{(p)}(\alpha, \beta, M, L) = \frac{1}{\Delta} E_m^{(p)}(\alpha, \beta, M, L) \quad (94)$$

$$\Delta = \sum_{p=1}^{N_c} \sum_{m=1}^{N_n^{(p)}} E_m^{(p)}(\alpha, \beta, M, L) \quad (95)$$

By repeating the above-mentioned procedures, $T_n$ is formed progressively.

Figure 27:
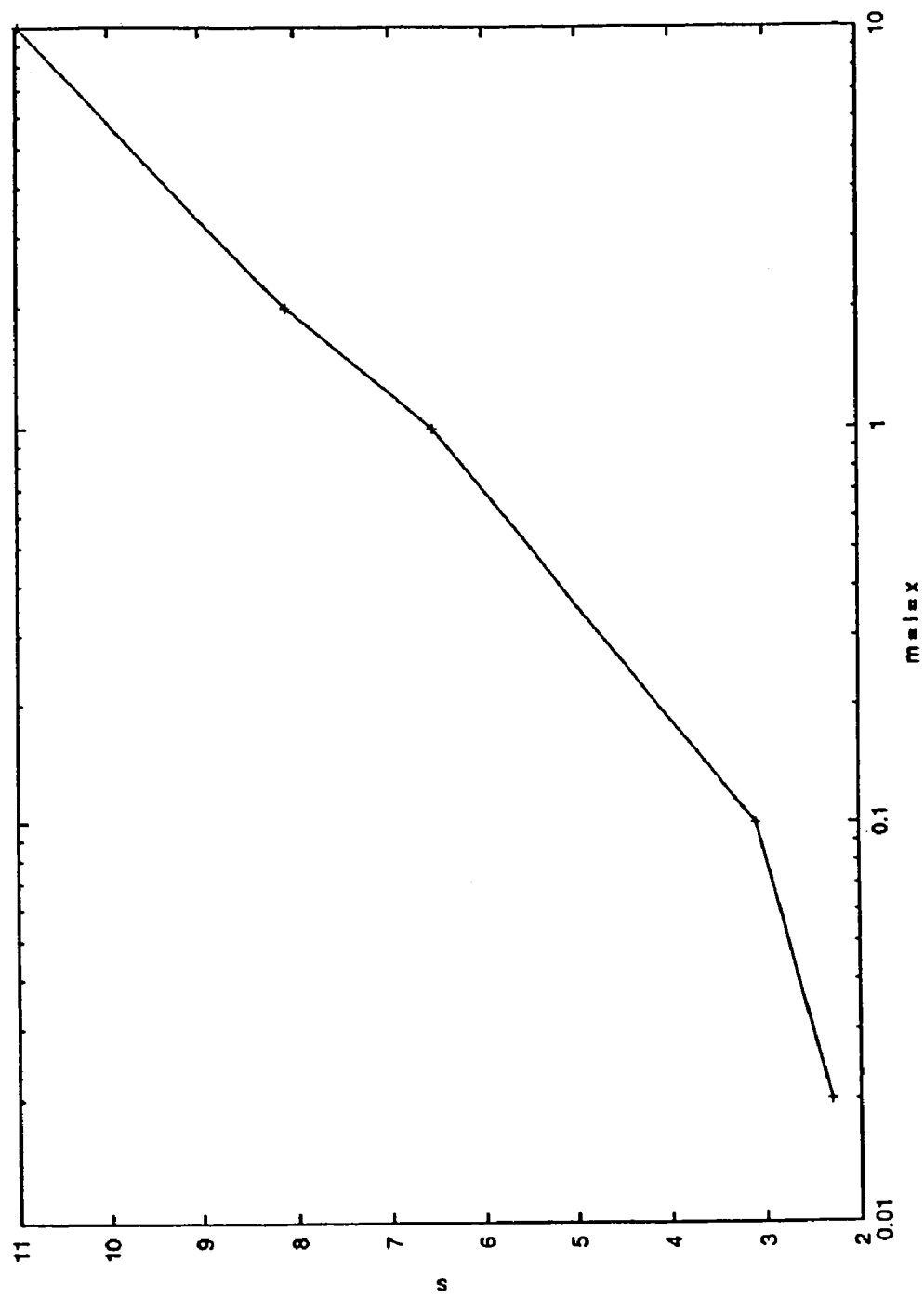
FIG. 27 is a schematic diagram that shows changes of normal deviation of distribution in the z-axis direction upon making a neural network by introducing an anisotropy merely in the z-axis direction on a three-dimensional lattice according to the invention.
Figure 28:
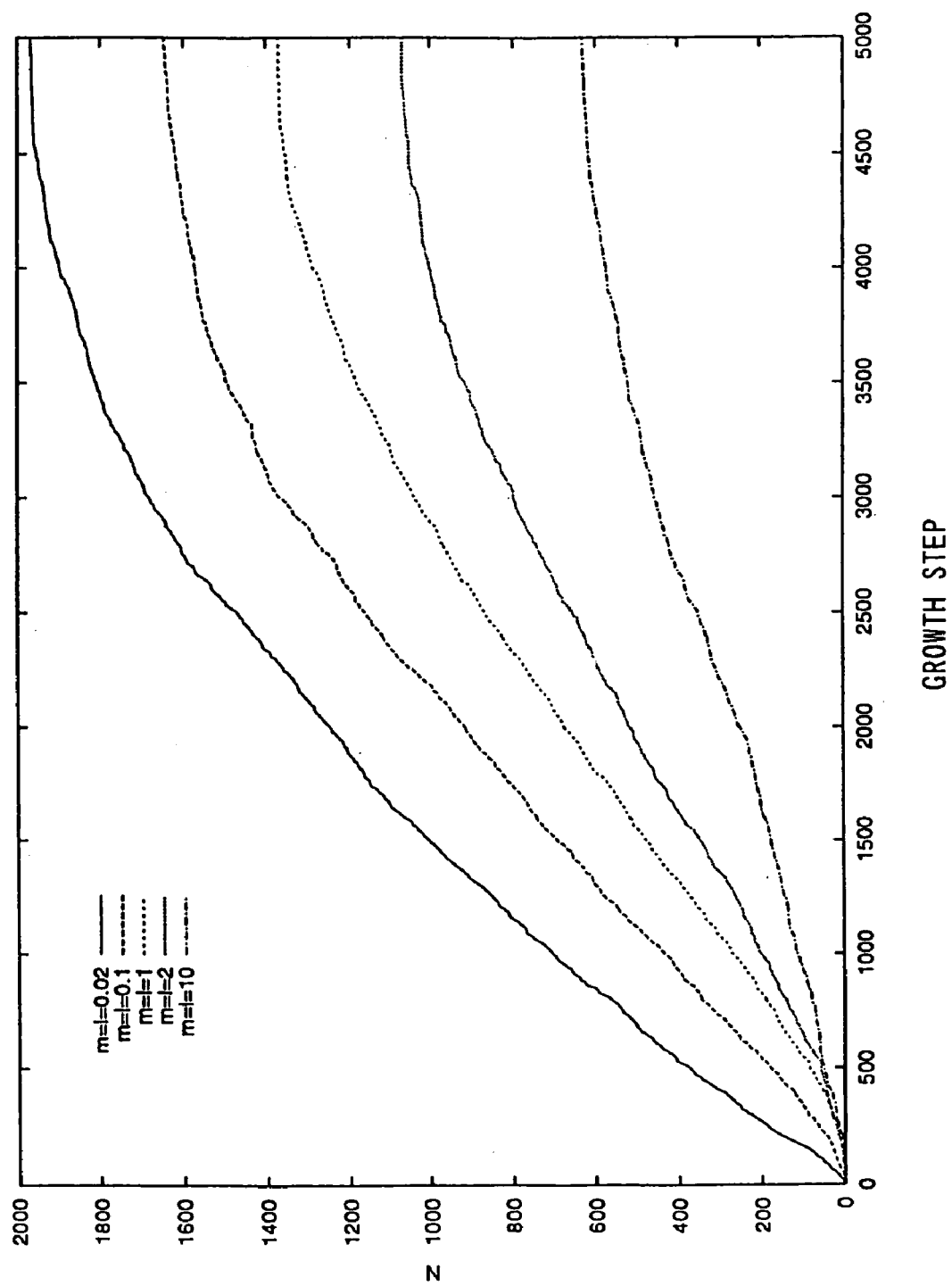
FIG. 28 is a schematic diagram that shows changes in number of adjacent sites among fractal figures for a growth step during fabrication of a neural network by introducing an anisotropy merely in the z-axis direction on a three-dimensional lattice according to the invention.
Figure 29:
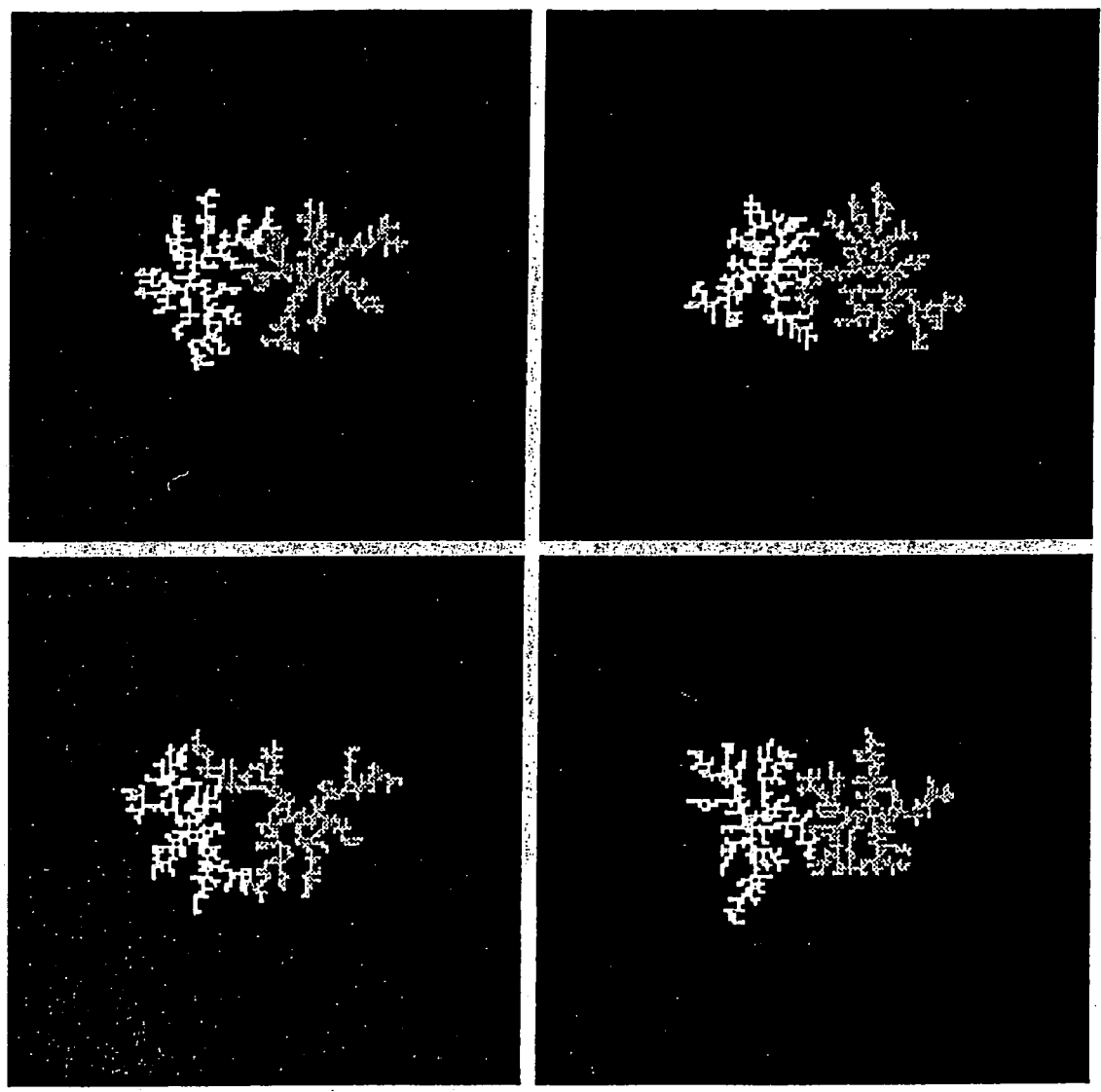
FIG. 29 is a schematic diagram that shows a result of simulation for growth of a coupled fractal network according to the invention.
Figure 30:
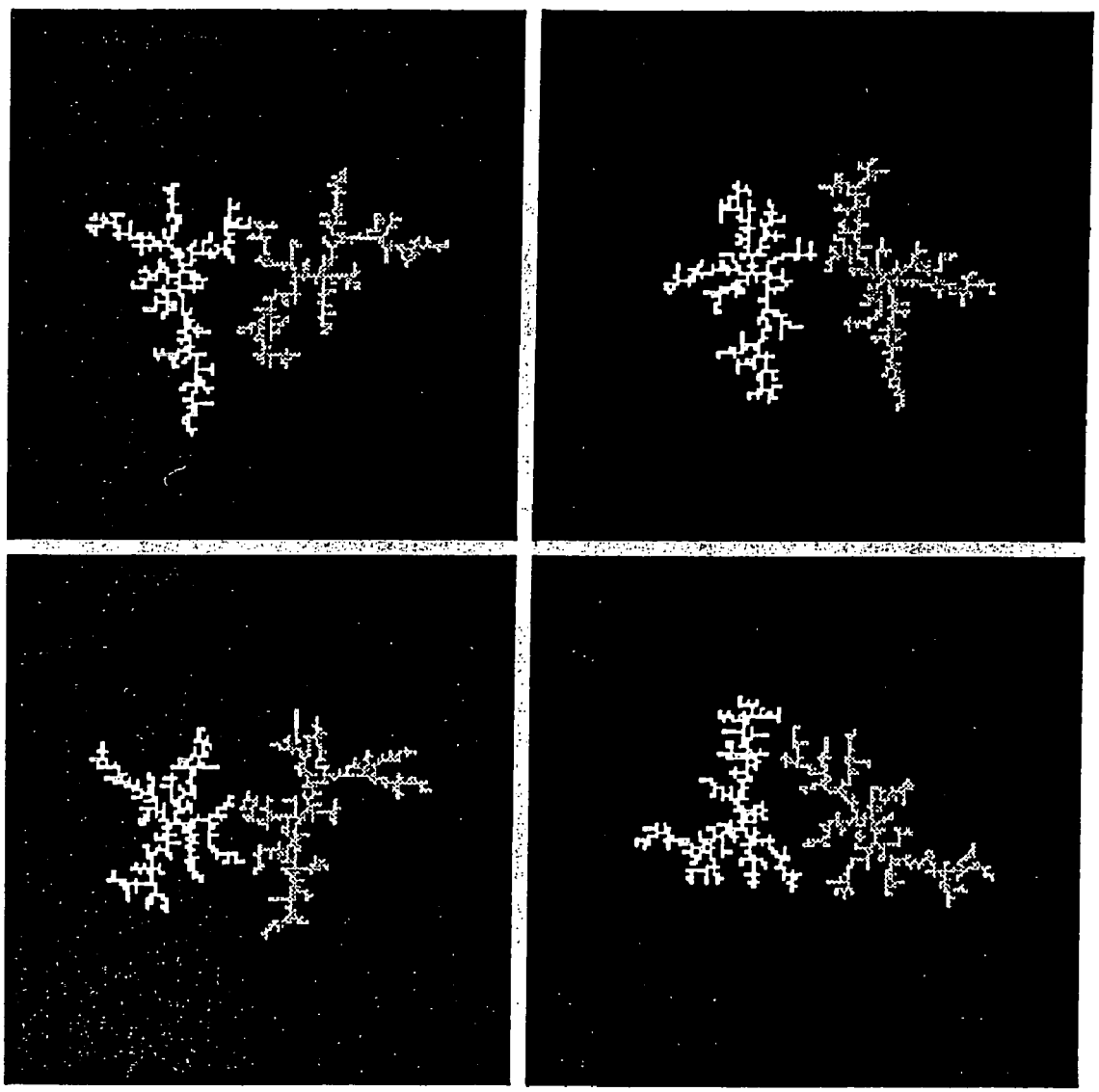
FIG. 30 is a schematic diagram that shows a result of simulation for growth of a coupled fractal network according to the invention.
Figure 31:
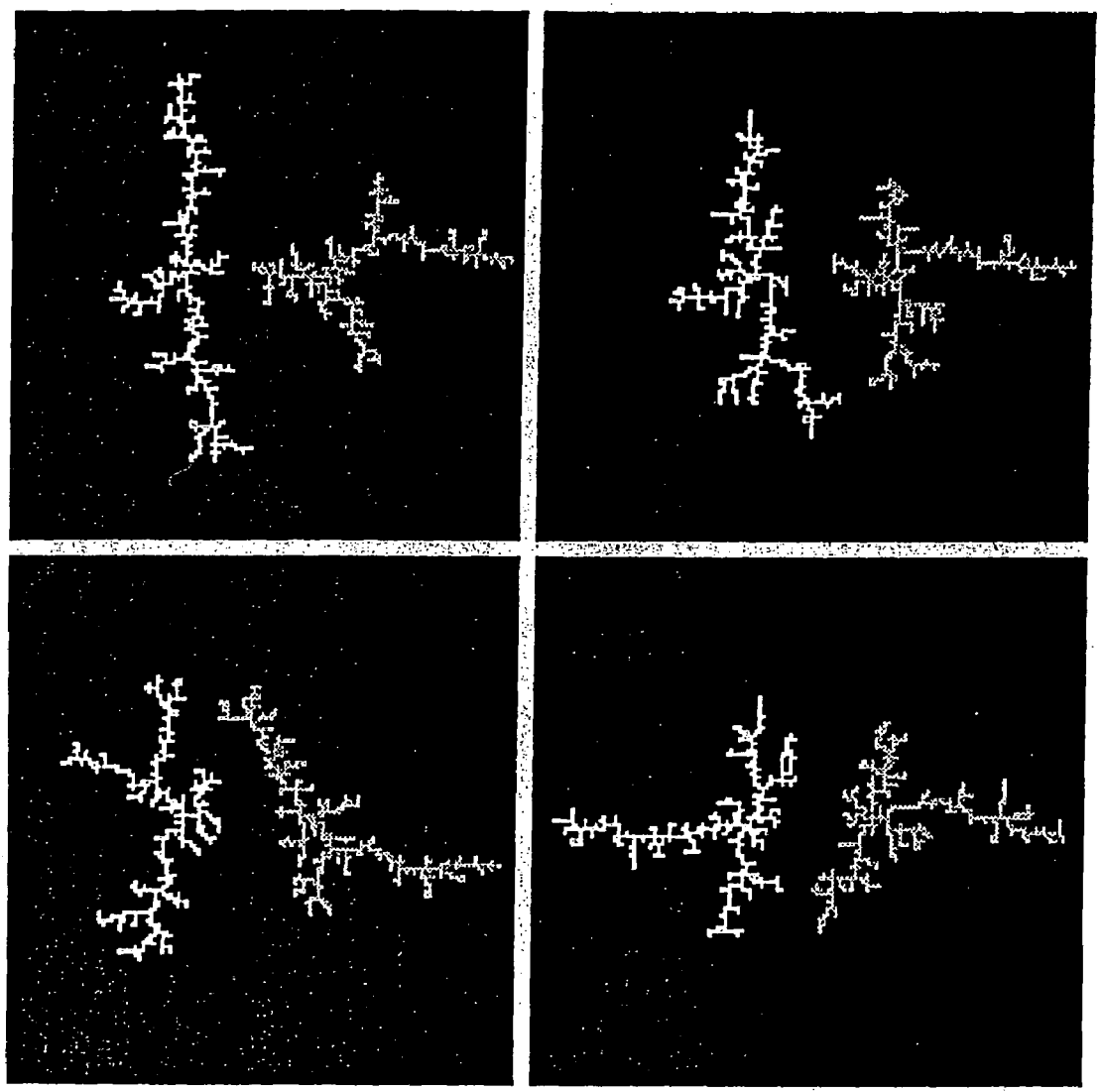
FIG. 31 is a schematic diagram that shows a result of simulation for growth of a coupled fractal network according to the invention.
Figure 32:
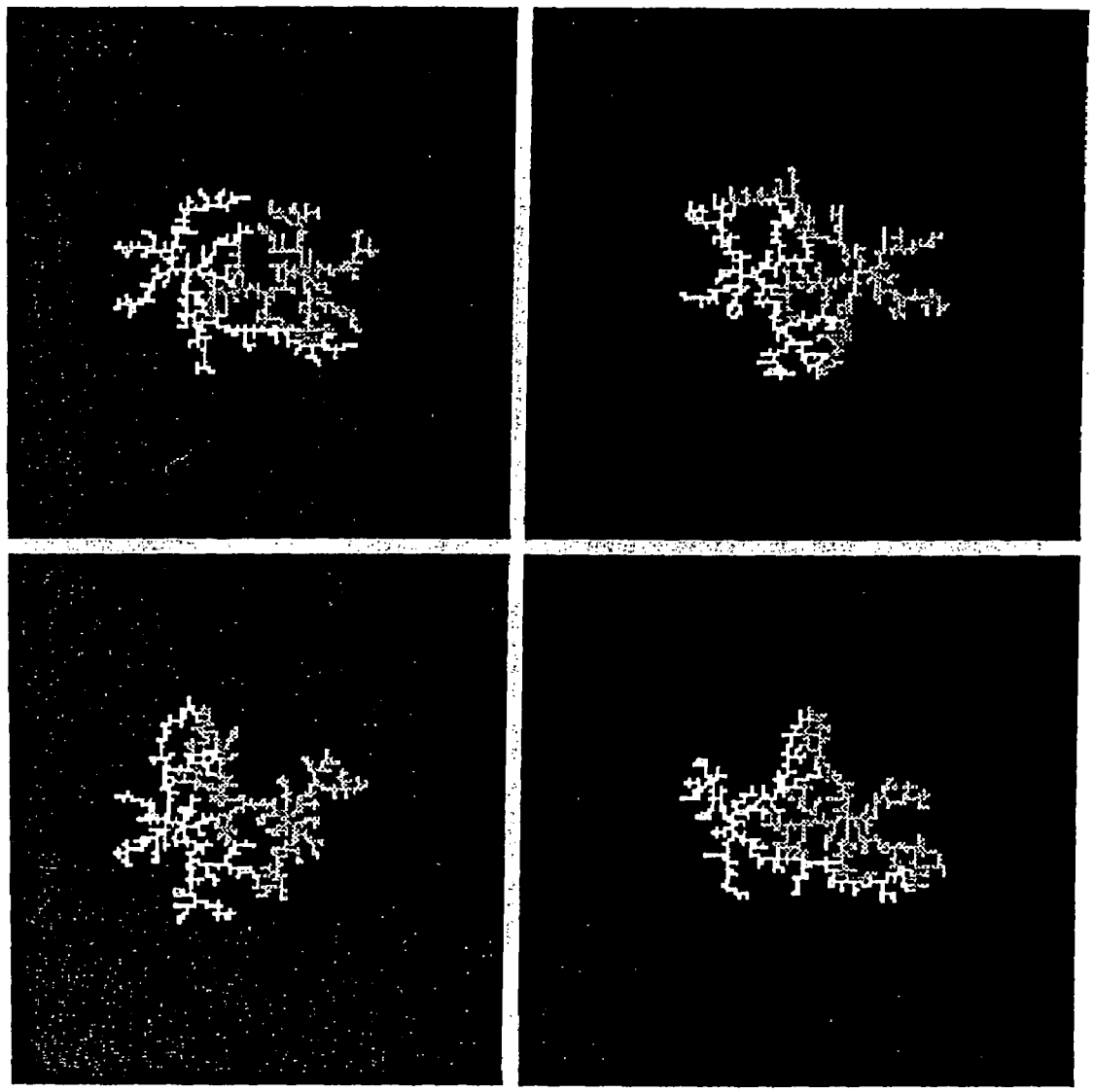
FIG. 32 is a schematic diagram that shows a result of simulation for growth of a coupled fractal network according to the invention.
Figure 33:
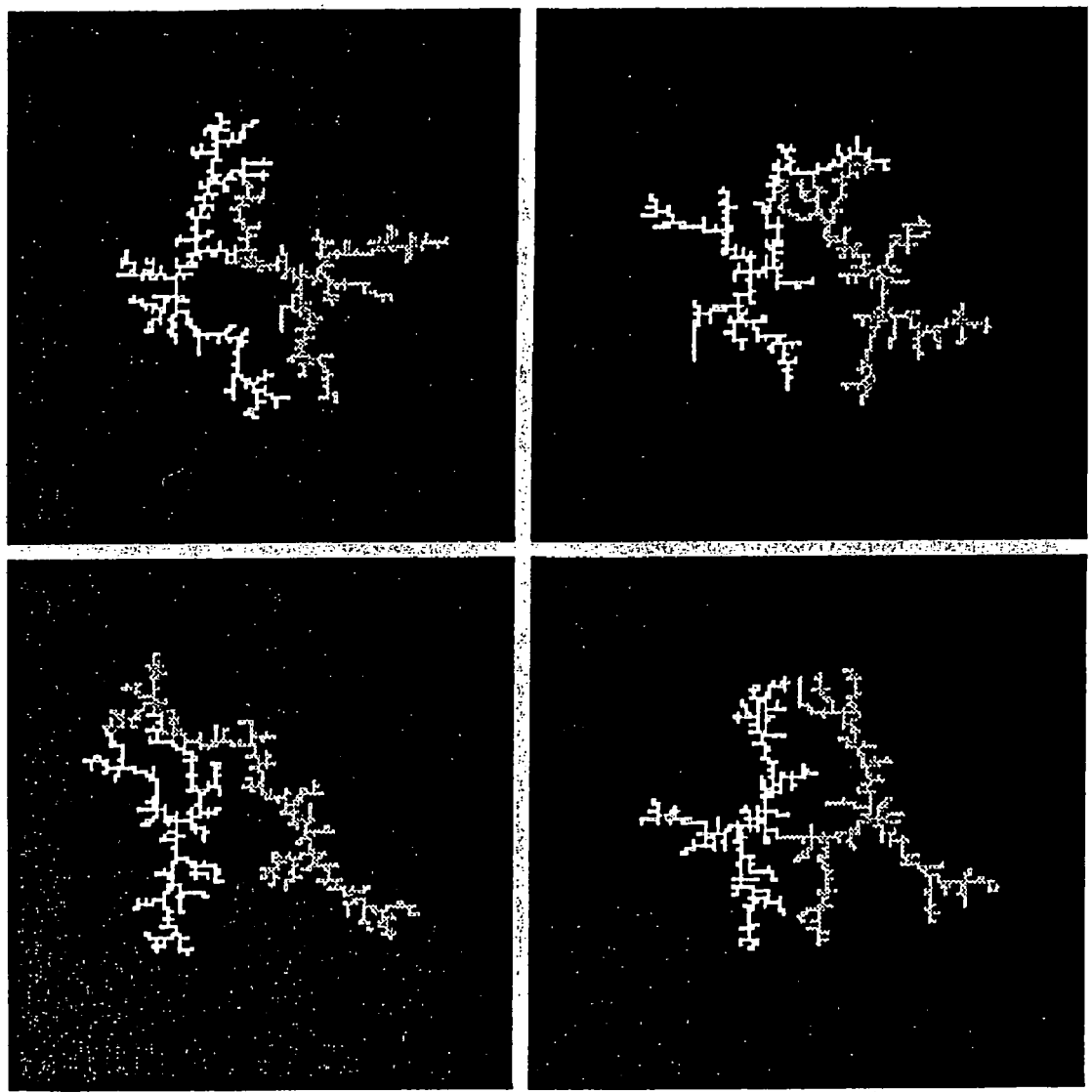
FIG. 33 is a schematic diagram that shows a result of simulation for growth of a coupled fractal network according to the invention.
Figure 34:
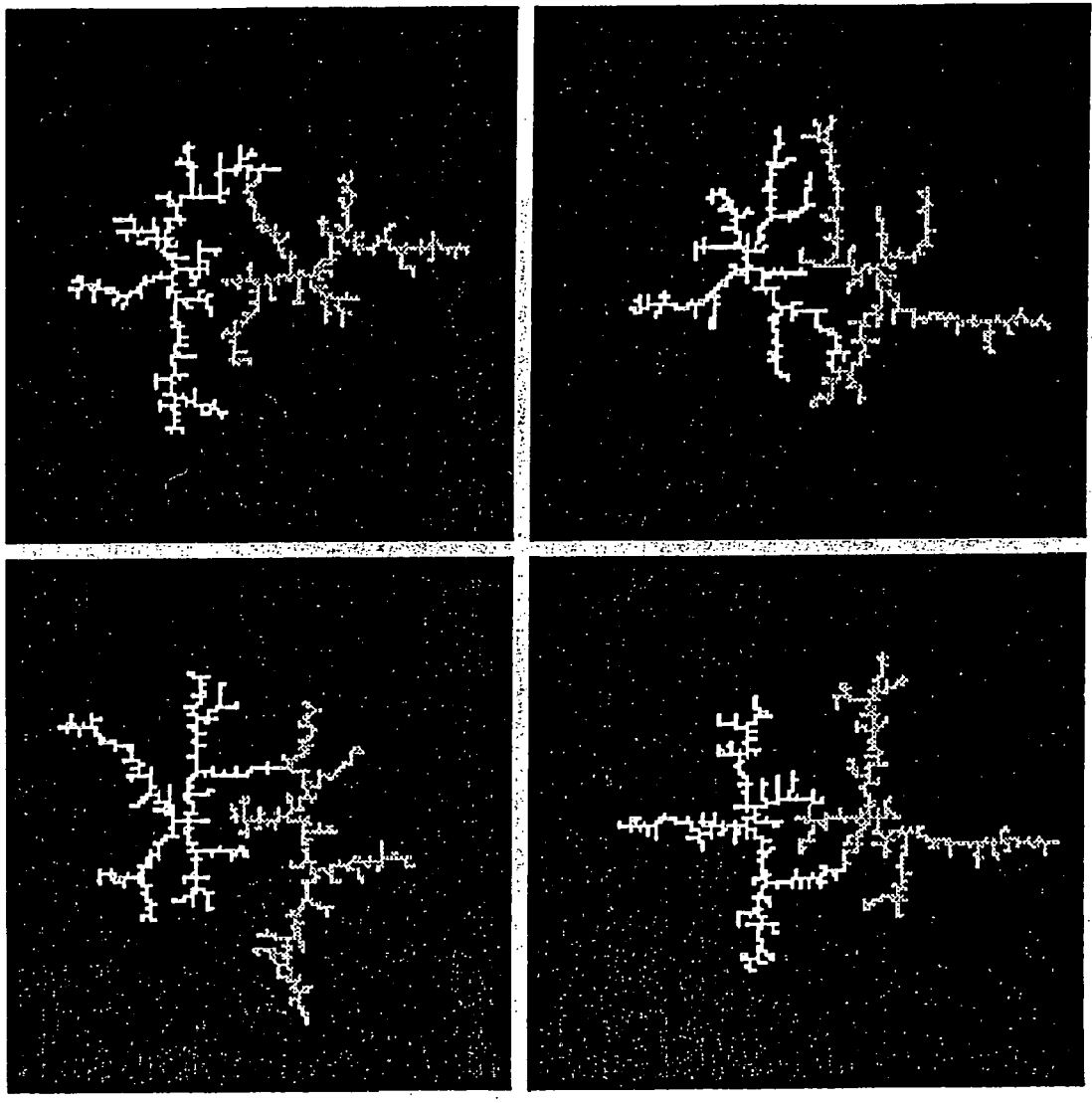
FIG. 34 is a schematic diagram that shows a result of simulation for growth of a coupled fractal network according to the invention.

Explained below is a specific example of the method for fabricating a neural network based on the model in (5) above. Results of simulations on a three-dimensional lattice are shown below. Introducing an anisotropy merely in the z-axis direction on a three-dimensional lattice, that is, determining as:

$$M = \begin{pmatrix} 1 & 0 & 0 \\ 0 & 1 & 0 \\ 0 & 0 & m \end{pmatrix}, L = \begin{pmatrix} 1 & 0 & 0 \\ 0 & 1 & 0 \\ 0 & 0 & l \end{pmatrix} \quad (96)$$

and fixing parameters as $(\alpha,\beta)=(0.4, 0.8)$ and $\psi_\infty=0$, 5000-step growth was conducted from three sites in an x-y plane. FIGS. 22 through 26 show coupled-fractal figures upon m=l=0.02, m=l=0.1, m=l=1.0, m=l=2.0 and m=l=10, respectively. FIG. 27 shows a normal deviation s in the distribution along the z-axis direction. In FIG. 27, the abscissa shows values of m=l=x. It is appreciated from these figures that distribution in the direction introducing the anisotropy can be controlled on a three-dimensional lattice. That is, by decreasing the value of m=l=x, growth in the z-axis direction can be suppressed, and to the contrary, by increasing the value of m=l=x, growth in the z-axis direction can be promoted. Here is reviewed that the number of adjacent sites among different fractal figures can be controlled approximately. FIG. 28 is a diagram made by plotting the number N of adjacent sites under the same situation as FIGS. 22 through 26, namely, under m=l=0.02, m=l=0.1, m=l=1.0, m=l=2.0 and m=l=10, taking growth steps on the abscissa. It is appreciated from FIG. 28 that as values of the parameters m and l decrease, i.e., as the growth sites extend in the x-y plane defining the start sites, the number of coupling progressively increases.

The simulation program for fabricating the neural network can be supplied in form of a recording medium that can be read through a computer.

(6) Statistical Interaction in a Coupled-Fractal Network

It is natural that fluctuation occurs in a structure made through a random process or in the processing using the structure due to the random process. The same applies to information processing in our brains. However, according to the matters having been clarified along with recent developments of the statistical physics, there is a phenomenon or a universal nature that appears in such a random system only when its statistic distribution is averaged.

In a coupled fractal network, if a row of random numbers is changed in its growth process, then the shape itself of the network to be made will change, but universal properties independent from the difference are believed to exist. One of them is the statistical interaction defined by the statistic distribution. The nature there of is clarified here.

Growth of a coupled-fractal network is characterized by two parameters $(\alpha, \beta)$. However, in actual growth tests, various networks are formed due to random variables. A review is made for universal properties not affected by the random variables.

In the simulation made below, growth of $N_c=2$ was conducted on a two-dimensional tetragonal lattice of 201×201. The first start site that is the element of $Q_0^{(1)}$ is (185, 100), and the second start site that is the element of $q_0^{(2)}$ is (117, 100). Regarding growth of n=800 steps, growth simulation was conducted for a different row of random numbers of M=300.

Examples of simulation results are shown in FIGS. 29 through 34. $(\alpha, \beta)=(0.4, 0.6)$ was used in FIG. 29, $(\alpha, \beta)=(0.8, 0.6)$ was used in FIG. 30, $(\alpha, \beta)=(1.2, 0.6)$ was used in FIG. 31, $(\alpha, \beta)=(0.4, 1)$ was used in FIG. 32, $(\alpha, \beta)=(0.8, 1)$ was used in FIG. 33, and $(\alpha, \beta)=(1.2, 1)$ was used in FIG. 34, respectively. In each of these figures, four examples of coupled-fractal networks are shown. They were grown by using the same $(\alpha, \beta)$ and different rows of random numbers. Every four examples are different coupled-fractal network structures, but have common properties, that is, properties regulated by $(\alpha, \beta)$. One of them is the fractal property of each element fractal, and it does not rely on interaction. What is discussed here is interaction among element fractals.

Interaction among element fractals can be defined solely by using a statistic average concerning a plurality of growth executed by using different rows of random numbers because there is no way of discriminating from a single growth simulation result whether the relationship among element fractals is regulated by interaction or individual element fractals have been formed independently Therefore, interaction among element fractals occurring in the statistic average of a number of growth simulations is called statistical interaction.

Growth of M=300 was conducted, and let each growth be distinguished from others by writing it with the suffix p as $T_n(p)$, p=1, 2, .... M. It can be written as:

$$T_n(p) = \bigcup_{k=1}^{N_c} Q_n^{(k)}(p) \tag{101}$$

by way of the element $Q_n^{(k)}(p)$ of each coupled-fractal network. The number of elements of $Q_n^{(k)}(p)$, i.e., the number of sites where k-th species in the p-th growth simulation are grown in n steps is written here as $M_{n,k,p}$. Let the barycentric coordinates of $Q_n^{(k)}(p)$ be introduced into:

$$w_n^{(k)}(p) = \frac{1}{M_{n,k,p}} \sum_{r \in Q_n^{(k)}(p)} r \tag{102}$$

The sample average of barycentric coordinates is:

$$w_n^{(k)} = \frac{1}{M} \sum_{p=1}^{M} w_n^{(k)}(p) \tag{103}$$

and the distance between the gravity expectation values:

$$R_n^{(k,l)} = |w_n^{(k)} - w_n^{(l)}| \tag{104}$$

is a convenient quantity. Then, for the purpose of analyzing the statistic interaction, a correlation function is introduced. It is:

$$G_n^{(k,l)} = \frac{1}{M} \sum_{p=1}^{M} x_n^{(k)}(p) \cdot x_n^{(l)}(p) \tag{105}$$

where $$x_n^{(k)}(p) = \frac{1}{M_{n,k,p}} \sum_{r \in Q_n^{(k)}(p)} (r - w_n^{(k)}) \tag{106}$$

What is analyzed here is an example of $N_c=2$. In particular, here are computed the expectation value of the barycentric distance of first and second species, namely:

$$D(n)=R_n^{(1,2)} \tag{107}$$

and the dimensionless quantity as the correlation intensity of the first species and the second species, namely:

$$\chi(n) = \frac{G_n^{(1,2)}}{\sqrt{G_n^{(1,1)} G_n^{(2,2)}}} \tag{108}$$

Figure 35:
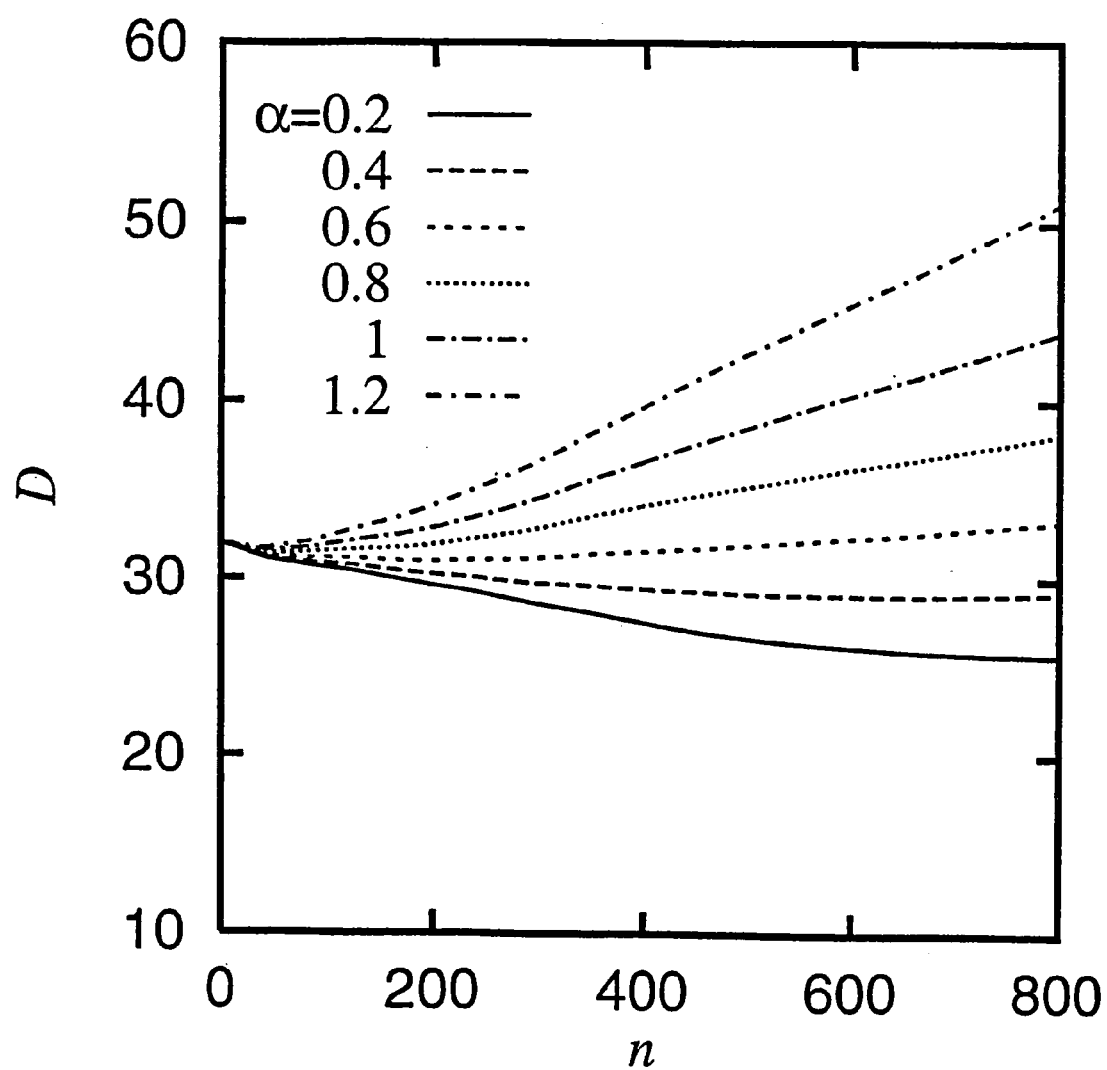
FIG. 35 is a schematic diagram that shows changes in distance between centers of gravity for a growth step in simulation of growth of a coupled fractal network according to the invention.
Figure 36:
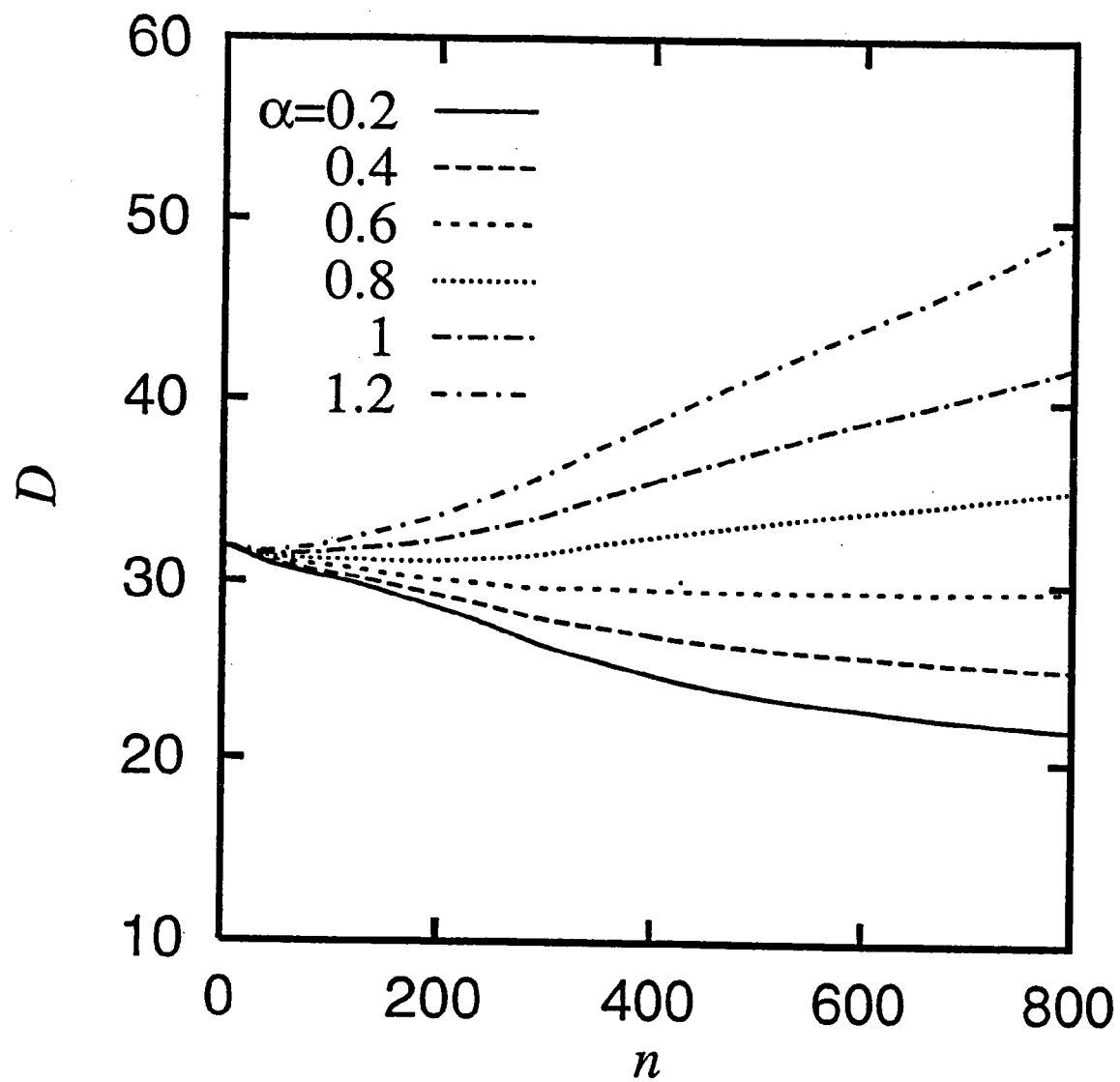
FIG. 36 is a schematic diagram that shows changes in distance between centers of gravity for a growth step in simulation of growth of a coupled fractal network according to the invention.
Figure 37:
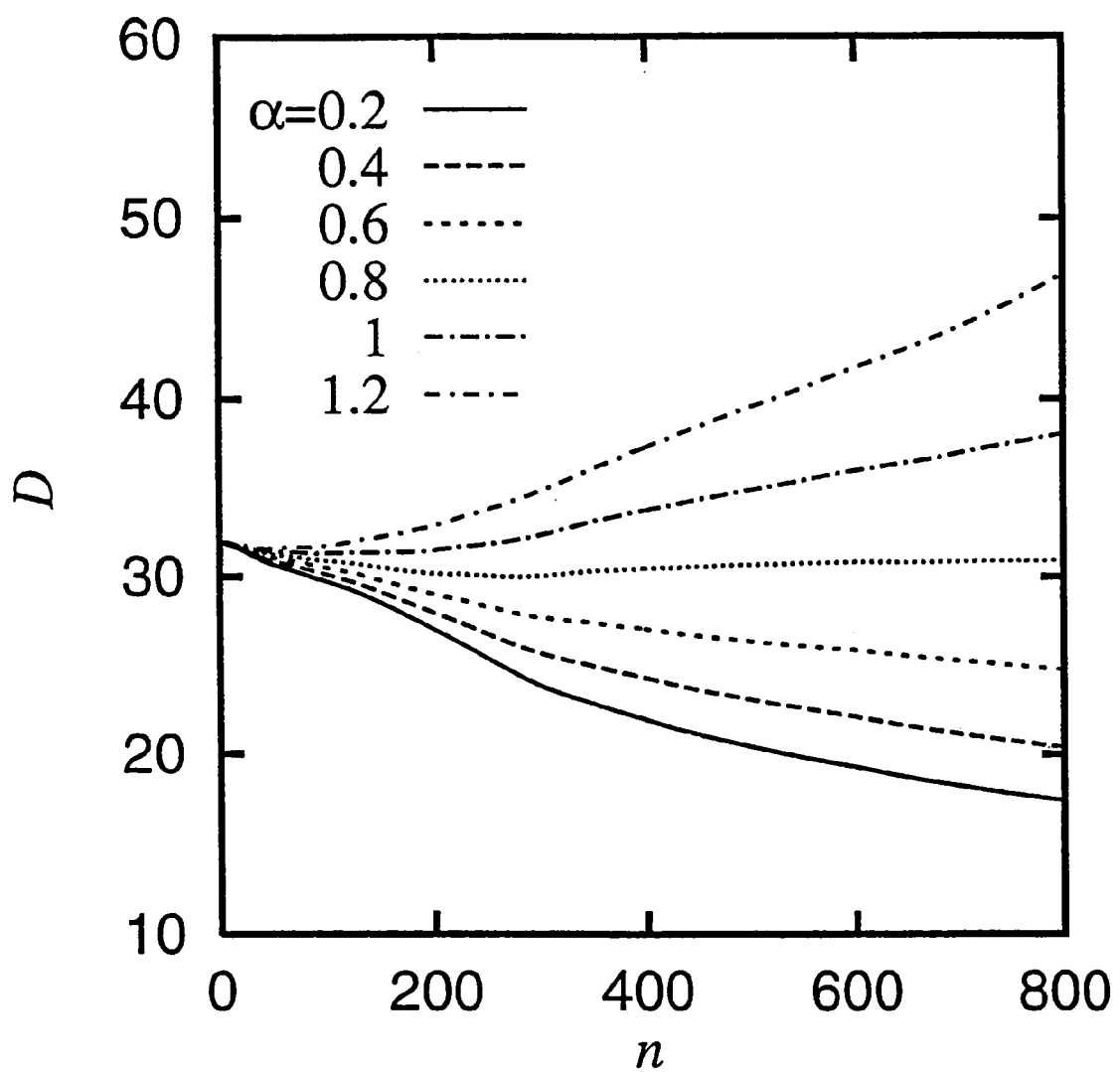
FIG. 37 is a schematic diagram that shows changes in distance between centers of gravity for a growth step in simulation of growth of a coupled fractal network according to the invention.

Barycentric distance in case of $\beta=0.6$ is shown in FIG. 35, that in case of $\beta=0.8$ is shown in FIG. 36, and that in case of $\beta=1$ is shown in FIG. 37, respectively. It is appreciated that the barycentric distances increase with the increase of $\alpha$, respectively. That is, since the barycentric distance always increases, it means that the coupled-fractal network grows outward. In this case, it is permitted to consider that a typical repulsive interaction is working. On the other hand, in case that D(n) decreases with n, a condensed network is formed. In this case, it is permitted to consider that a strong attractive interaction is working.

Figure 38:
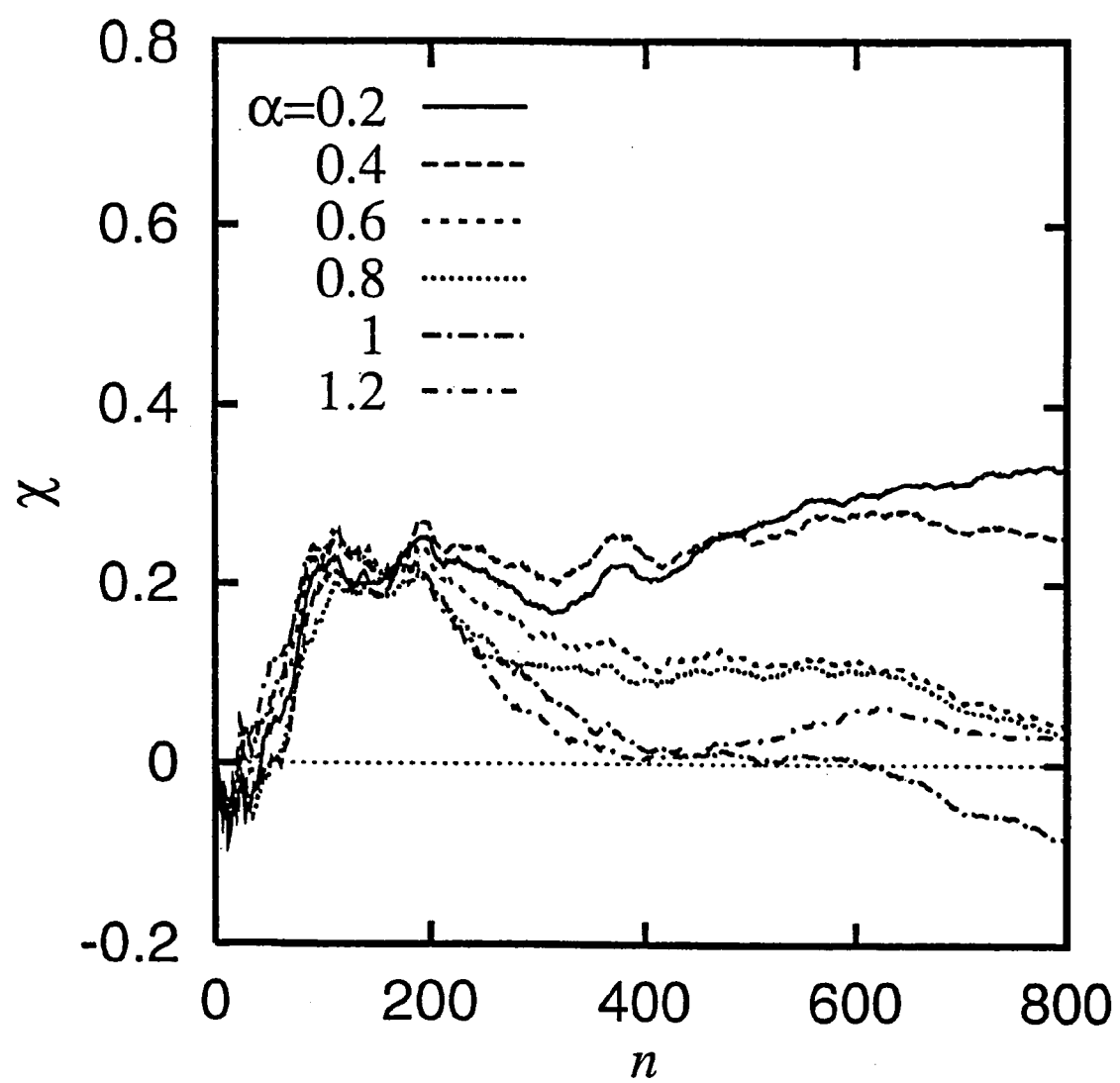
FIG. 38 is a schematic diagram that shows changes in distance between centers of gravity for a growth step in simulation of growth of a coupled fractal network according to the invention.
Figure 39:
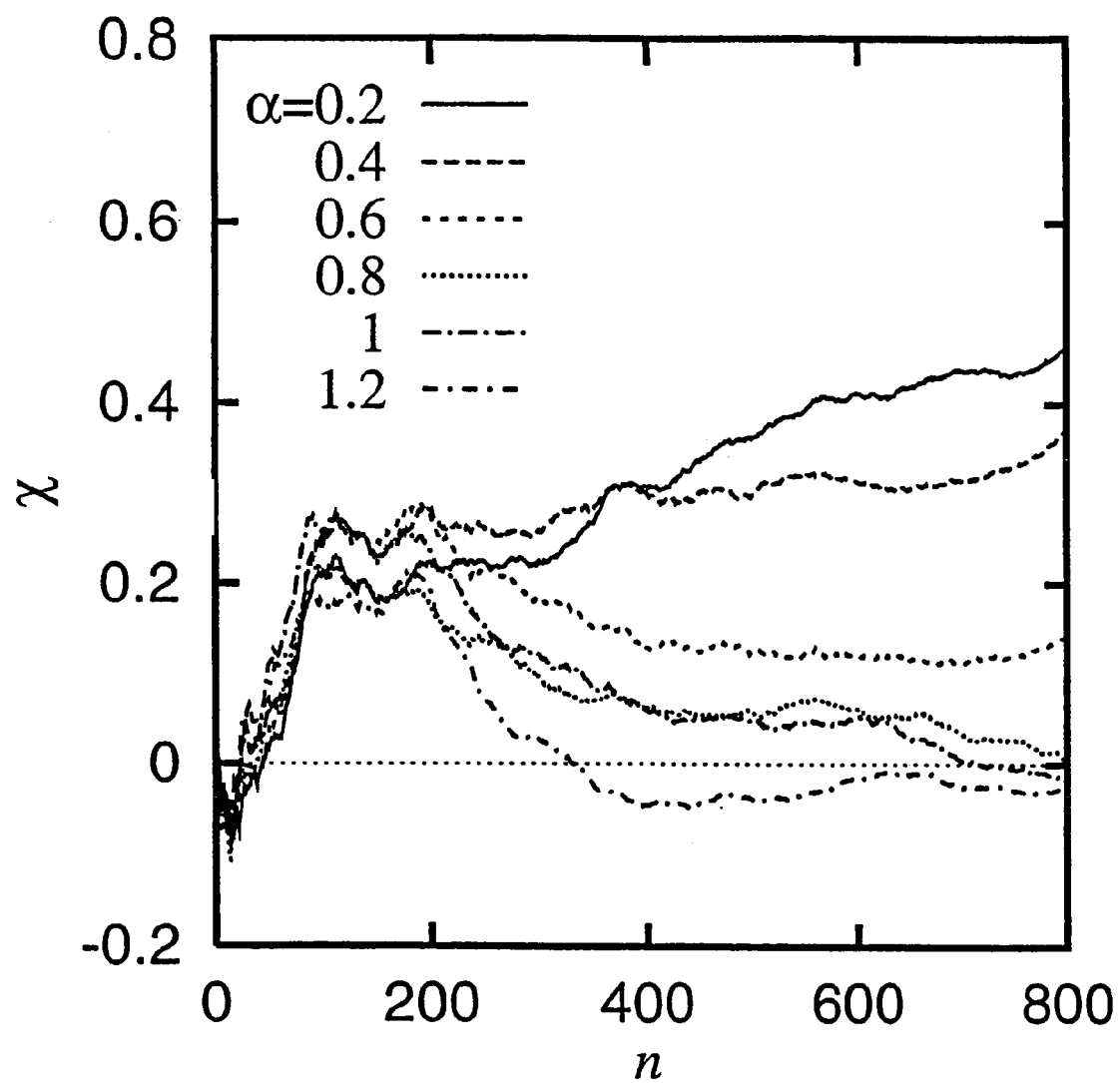
FIG. 39 is a schematic diagram that shows changes in distance between centers of gravity for a growth step in simulation of growth of a coupled fractal network according to the invention.
Figure 40:
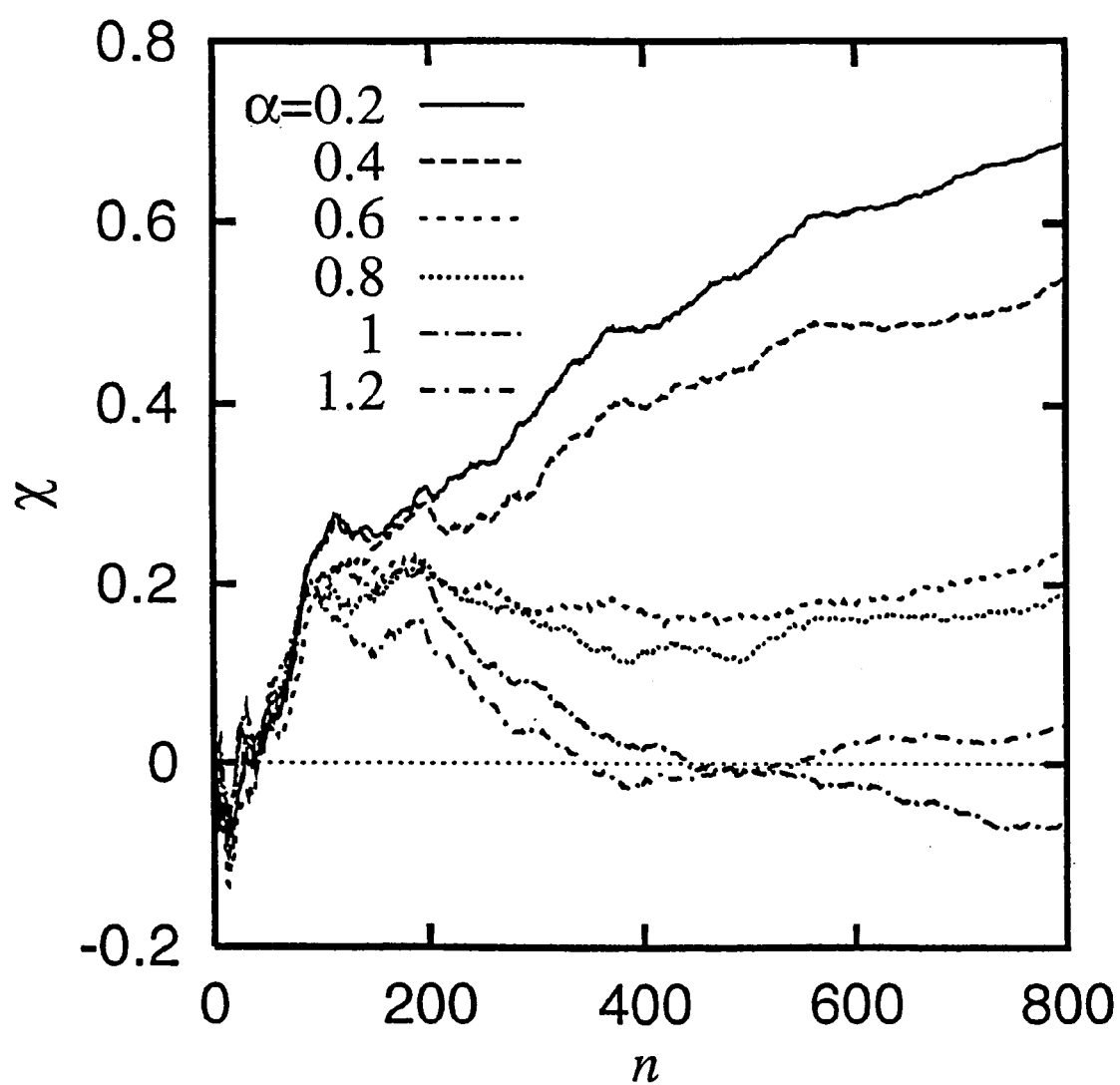
FIG. 40 is a schematic diagram that shows changes in distance between centers of gravity for a growth step in simulation of growth of a coupled fractal network according to the invention.

Here is reviewed the interaction intensity $\chi(n)$. FIG. 38 shows that in case of $\beta=0.6$, FIG. 39 shows that in case of $\beta=0.8$, and FIG. 40 shows that in case of $\beta=1$. In the region of n<100, a large difference is not observed. This is the region where growth progresses independently, and statistical interaction among species does not affect the configuration. In the region of 100<n<200, $\chi(n)$ maintains an approximately constant value around 0.2. Thereafter, in the region of n>200, statistical interaction among species depending upon $(\alpha, \beta)$ appears. It is appreciated that x decreases with an increase of $\alpha$. This can be understood more easily by giving a physical interpretation of $\chi(n)$. For example, let the specie 1 deviate to the left. Then, if the species 2 is also pulled to the left, it results in $\chi(n)>0$. That is, if $\chi(n)$ is a positive, large value, the species 2 is pulled by the species 1 and follows it. On the other hand, if x(n)<0, the species 2 results in growing in the opposite direction, and it can be said to be repulsive. Therefore, the interpretation that the attractive force gets weaker with an increase of a can be concluded to be quantitatively accurate in a statistical sense. It is appreciated that the statistical interaction is affected also by a difference of $\beta$. In FIG. 40, x changes largely in response to the change from $\alpha=0.2$ to $\alpha=1.2$, but this change decreases with the decrease of $\beta$. In the growth model of the coupled-fractal network, $\beta$ controlled the adsorption probability of the adhesive substance. It is presumed that a decrease of $\beta$ weakens the dependency of the adhesive substance upon its location, and thereby decreases the influences from positions where the other species are formed.

Summarizing the foregoing discussion, in a coupled-fractal network, statistical interaction among element fractals is defined by an ensemble average of a plurality of growth tests, and the universal nature of the network is controlled by the statistical interaction.

Although the invention has been explained by way of specific examples, the invention is not limited to those embodiments, but can be changed or modified in various modes based not departing from the technical concept of the invention.

As described above, according to the invention, since fractal structures are grown from a plurality of start sites, respectively, while having them interact with each other, to form fractal structures coupled to each other, a complicated network such as neural network can be made easily in a well-controlled manner. Especially when the space for growing fractal structures has an anisotropy, the coupling mode among different fractal structures can be controlled, and therefore, complicated networks such as neural networks, having a more variety of structures, can be made easily in a well-controlled manner.

The invention claimed is:

1. A method in a recording medium having a program for constructing a complex network, the method comprising the steps of:
defining a tetragonal lattice, wherein the tetragonal lattice comprises a plurality of lattice sites;
growing a first fractal structure from a first of the plurality of lattice sites, wherein the step of growing the first fractal structure comprises the steps of:
identifying the lattice sites adjacent to the first lattice site;
for each lattice site adjacent to the first lattice site;
determining the probability that the lattice site is selected as part of the first fractal structure;
selecting a next lattice site based on the probability that the lattice site is selected as part of the first fractal structure; and
adding the next lattice site to the first fractal structure;
until the first fractal structure is complete:
identifying the lattice sites adjacent to the next lattice site;
for each lattice site adjacent to the next lattice site;
determining the probability that the lattice site is selected as part of the first fractal structure;
selecting the next lattice site based on the probability that the lattice site is selected as part of the first fractal structure; and
adding the next lattice site to the first fractal structure;
growing a second fractal structure from a second of the plurality of lattice sites, wherein the step of growing the second fractal structure comprises the steps of:
identifying the lattice sites adjacent to the second lattice site;
for each lattice site adjacent to the second lattice site;
determining the probability that the lattice site is selected as part of the second fractal structure;
selecting another lattice site based on the probability that the lattice site is selected as part of the second fractal structure;
adding the other lattice site to the second fractal structure;
until the second fractal structure is complete:
identifying the lattice sites adjacent to the other lattice site;
for each lattice site adjacent to the other lattice site;
determining the probability that the lattice site is selected as part of the second fractal structure;
selecting the other lattice site based on the probability that the lattice site is selected as part of the second fractal structure; and
adding the other lattice site to the second fractal structure; and
coupling said first fractal structure to said second fractal structure during the step of growing said second fractal structure.

2. The method according to claim 1, further comprising the step of:
determining a growth rate based on a probability that a material reaches a portion already grown from said second start site in a diffusion process, and a probability that a growth promotion factor reaches the portion already grown from portions grown from said second start site in a diffusion process, wherein said first fractal structure is grown at said growth rate.

3. The method according to claim 2, wherein said growth rate is proportional to a product of a power function of the probability that a material reaches a portion already grown from said second start site in a diffusion process, and a power function of the probability that a growth promotion factor reaches the portion already grown from portions grown from said second start site in a diffusion process.

4. The method according to claim 2, further comprising the step of adjusting a parameter to control fractal property, self-similarity, complexity of the structure, or the number of coupling.

5. The method according to claim 3, further comprising the step of adjusting a parameter to control fractal property, self-similarity, complexity of the structure, or the number of coupling.

6. The method according to claim 4, wherein said parameter comprises the relative potential determining diffusion of the growth promotion factor of said first fractal structure in an appropriate relation to a site at infinity.

7. The method according to claim 5, wherein said parameter comprises the relative potential determining diffusion of the growth promotion factor of said first fractal structure in an appropriate relation to a site at infinity.

8. The method according to claim 1, wherein an anisotropy is introduced into a space in which said fractal structures are grown.

9. The method according to claim 2, wherein diffusion coefficient in a space in which said fractal structures are grown has an anisotropy.

10. The method according to claim 8, further comprising the step of adjusting a parameter to control fractal property, self-similarity, complexity of the structure, or the number of coupling.

11. The method according to claim 9, further comprising the step of adjusting a parameter to control fractal property, self-similarity, complexity of the structure, or the number of coupling.

12. The method according to claim 1, further comprising the step of:
determining a growth rate based on a probability that a material reaches a portion already grown from said first start site in a diffusion process, and a probability that a growth promotion factor reaches the portion already grown from portions grown from said first start site in a diffusion process, wherein said second fractal structure is grown at said growth rate.

13. The method according to claim 12, wherein said growth rate is proportional to a product of a power function of the probability that a material reaches a portion already grown from said first start site in a diffusion process, and a power function of the probability that a growth promotion factor reaches the portion already grown from portions grown from said first start site in a diffusion process.

14. The method according to claim 12, further comprising the step of adjusting a parameter to control fractal property, self-similarity, complexity of the structure, or the number of coupling.

15. The method according to claim 13, further comprising the step of adjusting a parameter to control fractal property, self-similarity, complexity of the structure, or the number of coupling.

16. The method according to claim 14, wherein said parameter comprises the relative potential determining diffusion of the growth promotion factor of said first fractal structure in an appropriate relation to a site at infinity.

17. The method according to claim 15, wherein said parameter comprises the relative potential determining diffusion of the growth promotion factor of said first fractal structure in an appropriate relation to a site at infinity.

18. The method according to claim 14, wherein said parameter comprises the relative potential determining diffusion of the growth promotion factor of said second fractal structure in an appropriate relation to a site at infinity.

19. The method according to claim 15, wherein said parameter comprises the relative potential determining diffusion of the growth promotion factor of said second fractal structure in an appropriate relation to a site at infinity.

20. The method according to claim 4, wherein said parameter comprises the relative potential determining diffusion of the growth promotion factor of said second fractal structure in an appropriate relation to a site at infinity.

21. The method according to claim 5, wherein said parameter comprises the relative potential determining diffusion of the growth promotion factor of said second fractal structure in an appropriate relation to a site at infinity.

22. The method according to claim 12, wherein diffusion coefficient in a space in which said fractal structures are grown has an anisotropy.

23. The method according to claim 22, further comprising the step of adjusting a parameter to control fractal property, self-similarity, complexity of the structure, or the number of coupling.

* * * * *